United States Patent
Hansen et al.

(10) Patent No.: US 11,616,810 B2
(45) Date of Patent: Mar. 28, 2023

(54) METHODS AND SYSTEMS FOR RANSOMWARE DETECTION, ISOLATION AND REMEDIATION

(71) Applicant: DATTO, INC., Norwalk, CT (US)

(72) Inventors: Kurt Hansen, Rungsted Kyst (DK); Kevin Knoop, Cape Town (ZA); Stan Geoffrey Lee, High Wycombe (GB)

(73) Assignee: DATTO, INC., Norwalk, CT (US)

( * ) Notice: Subject to any disclaimer, the term of this patent is extended or adjusted under 35 U.S.C. 154(b) by 0 days.

(21) Appl. No.: 17/128,048

(22) Filed: Dec. 19, 2020

(65) Prior Publication Data
US 2021/0152595 A1   May 20, 2021

Related U.S. Application Data

(63) Continuation-in-part of application No. 16/840,665, filed on Apr. 6, 2020, now Pat. No. 11,347,881, and (Continued)

(51) Int. Cl.
*H04L 9/40*   (2022.01)
*H04L 9/00*   (2022.01)

(52) U.S. Cl.
CPC .......... *H04L 63/1466* (2013.01); *H04L 9/002* (2013.01); *H04L 63/1416* (2013.01)

(58) Field of Classification Search
CPC . H04L 63/1466; H04L 63/1416; H04L 9/002; G06F 21/554; G06F 21/566; G06F 21/568
See application file for complete search history.

(56) References Cited

U.S. PATENT DOCUMENTS 9,053,216 B1   6/2015   Coleman et al.
9,317,686 B1 * 4/2016   Ye ....................... G06F 11/1448
(Continued)

FOREIGN PATENT DOCUMENTS

EP   3038003 A1   6/2016
WO   2020028152   2/2020

OTHER PUBLICATIONS

Christensen et al., Ransomware Detection and Mitigation Tool, Technical University of Denmark, Department of Applied Mathematics and Computer Science, 2017.
(Continued)

*Primary Examiner* — Robert B Leung
(74) *Attorney, Agent, or Firm* — Maschoff Brennan

(57) ABSTRACT

Ransomware detection and/or isolation and/or remediation of a ransomware-encryption device is performed in a Remote Monitoring and Management (RMM) system environment. The RMM system is operatively associated with monitoring and managing a plurality of devices and, according to an exemplary embodiment, the RMM system includes a RMM agent module locally installed on each device, a cloud-based RMM platform operatively communicating with each device RMM agent module, and a Ransomware Detection (RD)/Isolation module locally installed on each device. The RD/Isolation module locally detects a potential ransomware-encryption in one or more files received by the device and the RMM system isolates a ransomware affected device using a locally executed script provided by the cloud-based RMM platform.

25 Claims, 8 Drawing Sheets

Related U.S. Application Data a continuation-in-part of application No. 16/431,188, filed on Jun. 4, 2019, now Pat. No. 10,990,675.

(56) References Cited

U.S. PATENT DOCUMENTS

| | | |
|---|---|---|
| 9,323,638 B2 | 4/2016 | Coleman et al. |
| 9,734,337 B1 | 8/2017 | Patton |
| 9,935,973 B2 | 4/2018 | Crofton et al. |
| 10,121,003 B1 | 11/2018 | Adams |
| 10,229,269 B1 | 3/2019 | Patton |
| 10,262,138 B2 | 4/2019 | Boutnaru |
| 2010/0287383 A1 | 11/2010 | Conte |
| 2011/0107043 A1 | 5/2011 | Palagummi |
| 2013/0326625 A1 | 12/2013 | Anderson |
| 2015/0254566 A1 | 9/2015 | Chandramouli |
| 2017/0177452 A1 | 6/2017 | Parab |
| 2017/0206353 A1 | 7/2017 | Jai et al. |
| 2017/0223031 A1 | 8/2017 | Gu |
| 2017/0364681 A1* | 12/2017 | Roguine ............... G06F 21/554 |
| 2018/0018458 A1* | 1/2018 | Schmugar ............. G06F 21/554 |
| 2018/0024893 A1 | 1/2018 | Selle |
| 2018/0075234 A1 | 3/2018 | Boutnaru |
| 2018/0107824 A1 | 4/2018 | Gibbons et al. |
| 2018/0115577 A1 | 4/2018 | Shukla et al. |
| 2018/0121650 A1* | 5/2018 | Brown .................. G06F 21/561 |
| 2018/0248896 A1 | 8/2018 | Challita et al. |
| 2018/0288087 A1 | 10/2018 | Hittel et al. |
| 2018/0307839 A1 | 10/2018 | Bhave |
| 2018/0330088 A1 | 11/2018 | Crofton et al. |
| 2019/0012458 A1* | 1/2019 | Fausak .................. G06F 21/565 |
| 2019/0108340 A1 | 4/2019 | Bedhapudi et al. |
| 2019/0138727 A1 | 5/2019 | Dontov et al. |
| 2019/0158512 A1 | 5/2019 | Zhang |
| 2019/0294507 A1 | 9/2019 | Linnen |
| 2020/0003453 A1 | 1/2020 | Chen |
| 2020/0004962 A1 | 1/2020 | Araujo |

OTHER PUBLICATIONS

DEW Assciates Corporation, NTFS Directories and Files, http://www.dewassoc.com/kbase/windows_nt/ntfs_directories_and_files.htm, 2000.

Jung et al., Ransomware Detection Method Based on Context-Aware Entropy Analysis. Soft Computing 22, 6731-6740, 2018.

Lyda et al., Using Entropy Analysis to Find Encrypted and Packed Malware, Computer Science IEEE Security & Pivracy, 2007.

Mathews, Module for Monte Carlo Pi, http://mathfaculty.fullerton.edu/mathews//n2003/MonteCarloPiMod.html, 2003.

Miller, CS 537 Lecture Notes, Section 26, Window (NT) File System, Chapter 22, Section 22.5 in Operating Systems Concepts, 2002.

Scaife et al., CryptoLock (and Drop It): Stopping Ransomware Attacks on User Data, 2016 IEEE 36th International Conference on Distributed Computing Systems (ICDCS), NARA, 2016, pp. 303-312.

U.S. Appl. No. 16/431,188, filed Jun. 4, 2019.

U.S. Appl. No. 16/840,665, filed Apr. 6, 2020.

International Search Report and Written Opinion dated May 30, 2022 in PCT Application No. PCT/US2021/063532.

Berrueta Eduardo et al, "A Survey on Detection Techniques for Cryptographic Ransomware", IEEE Access, vol. 7, Oct. 7, 2019 (Oct. 7, 2019), pp. 144925-144943.

Lock Matt, "Five steps to beating ransomware's five-minute warning", Nov. 1, 2020 (Nov. 1, 2020), vol. 2020, No. 11, pp. 6-8.

* cited by examiner

METHODS AND SYSTEMS FOR RANSOMWARE DETECTION, ISOLATION AND REMEDIATION

CROSS REFERENCE TO RELATED APPLICATION

The present application is a continuation-in-part and claims the benefit of U.S. patent application Ser. No. 16/431,188, filed Jun. 4, 2019, and is a continuation-in-part and claims the benefit of U.S. patent application Ser. No. 16/840,665, filed Apr. 6, 2020.

BACKGROUND

The present exemplary embodiment relates U.S. patent application Ser. No. 16/431,188, filed Jun. 4, 2019 to methods and systems for ransomware detection, isolation and/or remediation. It finds particular application in conjunction with Remote Monitoring and Management (RMM) systems and will be described with particular reference thereto. However, it is to be appreciated that the present exemplary embodiments are also amenable to other like applications.

INCORPORATION BY REFERENCE

U.S. Pub. No. 2018/0107824 filed Oct. 17, 2017 and titled "SYSTEMS AND METHODS FOR DETECTING RANSOMWARE INFECTION", first named inventor Robert John Gibbons, Jr., is incorporated by reference herein in its entirety. U.S. Pub. No. 2018/0107824 discloses, as some illustrative embodiments, systems and methods for detecting ransomware infection in filesystems. These systems and methods may enable a computer user to detect a ransomware infection within a filesystem utilizing a snapshot image-based backup. According to some embodiments, the disclosed systems and methods analyze metadata describing the contents of an examined filesystem embodied in a Master File Table (MFT). Also, according to some embodiments, the disclosed systems and methods compute an entropy associated with an extracted sample of files to distinguish between infected and uninfected file systems. Relative to other techniques, the disclosed systems/methods can decrease the time and/or computational resources required to detect ransomware, while also decreasing false positives and false negatives.

U.S. Ser. No. 16/431,188 filed Jun. 4, 2019 and titled "METHODS AND SYSTEMS FOR DETECTING A RANSOMWARE ATTACK USING ENTROPY ANALYSIS AND FILE UPDATE PATTERNS", first named inventor Kurt Hansen, is incorporated by reference herein in its entirety. U.S. Ser. No. 16/431,188 discloses, as some illustrative embodiments, methods, and systems for detecting a ransomware-encryption in one or more files. According to an exemplary embodiment, a low frequency encryption analysis and a high frequency encryption analysis of a plurality of received files is performed to determine if the one or more of the files are encrypted. If a file is encrypted, a watcher is utilized to monitor file-events associated with the files for determining if one or more of the files are infected with ransomware.

U.S. Ser. No. 16/840,665 filed Apr. 6, 2020 and titled "METHODS AND SYSTEMS FOR DETECTING RANSOMWARE ATTACK IN INCREMENTAL BACKUP," first named inventor Kurt Hansen, is incorporated by reference herein in its entirety. Ransomware attack (RWA) detection is performed during an incremental or differential backup of a system of folders or directories of a computer or network of computers via an electronic network. The RWA detection protection includes processing incremental or differential backup metadata acquired during the incremental or differential backup to determine whether a RWA alert is issued. RWA remediation is performed at least in part on the RWA alert being issued. The RWA alert may be issued based on processing of the incremental or differential backup metadata to identify candidate new files and candidate deleted files in which the candidate new files are candidates for being encrypted copies of the candidate deleted files. RWA alert criterion may be based on counts of new versus deleted files in a folder or directory, and comparison of file sizes of the new versus deleted files.

U.S. Patent Publication No. 2019/0138727 A1, Published May 9, 2019, by Dumitru Dontov et al., and entitled "RANSOMWARE PROTECTION FOR CLOUD STORAGE SYSTEMS";

U.S. Patent Publication No. 2019/0108340 A1, Published Apr. 11, 2019, by Puma Chandra Sekhar Bedhapudi et al., and entitled "RANSOMWARE DETECTION";

U.S. Patent Publication No. 2018/0288087 A1, Published Oct. 4, 2018, by Sean Hittel et al., and entitled "SIMULATION AND VISUALIZATION OF MALWARE SPREAD IN A CLOUD-BASED COLLABORATION ENVIRONMENT";

U.S. Patent Publication No. 2018/0075234, published Mar. 15, 2018, by Shlomi Boutnaru, and entitled "TECHNIQUES FOR DETECTING ENCRYPTION";

U.S. Patent Publication No. 2018/0075239, published Mar. 15, 2018 (now U.S. Pat. No. 10,262,138, issued Apr. 16, 2019), by Shlomi Boutnaru, and entitled "TECHNIQUES FOR RANSOMWARE DETECTION AND MITIGATION";

U.S. Patent Publication No. 2018/0115577, published Apr. 26, 2018, by Shukla et al., and entitled "SYSTEM AND METHOD FOR DETECTING AND MITIGATING RANSOMWARE THREATS";

U.S. Patent Publication No. 2017/0206353 A1, Published Jul. 20, 2017, by Benchiao Jai et al., and entitled "METHOD AND SYSTEM FOR PREVENTING MALICIOUS ALTERATION OF DATA IN COMPUTER SYSTEM";

"RANSOMWARE DETECTION METHOD BASED ON CONTEXT-AWARE ENTROPY ANALYSIS," Soft Computing (2018) 22:6731-6740, https://doi.org/10.1007/s00500-018-3257-z;

"USING ENTROPY ANALYSIS TO FIND ENCRYPTED AND PACKED MALWARE", Robert Lyda, James Hamrock, http://citeseerx.ist.psu.edu/viewdoc/download?doi=10.1.1.120.9861&rep=rep1&type=pdf;

"RANSOMWARE DETECTION AND MITIGATION TOOL," Jesper B. S. Christensen, Niels Beuschau, M S Thesis, http://www2.imm.dtu.dk/pubdb/views/edoc_download.php/7039/pdf/imm7039.pdf; and "CRYPTOLOCK (AND DROP IT): STOPPING RANSOMWARE ATTACKS ON USER DATA," Nolen Scaife, Henry Carter, Patrick Traynor, Kevin R. B. Butler, 2016 IEEE 36th International Conference on Distributed Computing Systems, https://ieeexplore.ieee.org/document/7536529, are incorporated herein by reference in their entirety.

BRIEF DESCRIPTION

In one embodiment of this disclosure, described is a compute-implemented method for detecting a ransomware-encryption in a plurality of files received by a device operatively associated with a Remote Monitoring and Management (RMM) system, the RMM system operatively associated with monitoring and managing a plurality of devices and the RMM system including a RMM agent module locally installed on each device and operatively communicating with an operating system (OS) installed on each device, in addition, the RMM system includes a cloud-based RMM-platform operatively communicating with each device RMM agent module, the cloud based RMM platform configured to monitor and manage each of the plurality of devices, and a Ransomware Detection (RD) module locally installed on each device and operatively communicating with each respective device agent module, the RD module configured to detect a potential ransomware-encryption in the plurality of files received. The exemplary method for detecting a ransomware-encryption including: a) the RD module receiving from the RMM platform ransomware monitor configuration data, the ransomware monitor configuration data including one or more watch-items including a list of one or more files, drives, and volumes to monitor for ransomware detection; b) the RD module initiating a filewatcher and filewatcher handler to monitor and receive callbacks for create, delete, update, and rename file-events associated with the watch-items, the filewatcher adding each create, delete, update and rename file-event to a metadata watch-item file-event queue, the metadata watch-item file-event queue including raw watch-item file-event data associated with each create, delete, update, and rename file-event associated with the watch-items, the raw-data including one or more of fileobjects and parent folders identified in the watch-item file-event; c) a RD module scheduler processing the metadata watch-item file-event queue according to a preset time-based schedule, the scheduler processing any watch-item file-event data included in the metadata watch-item file-event queue to determine a RW-alert state of the RD module, the scheduler operatively associated with an entropy-analysis-based ransomware detection process to detect potential ransomware-encryption of one or more of the watch-items listed in the watch-item file-event queue and generate the RW-alert state which is representative of a positive or negative detection of ransomware-encryption of one or more of the watch-items listed in the watch-item file-event queue.

In another embodiment of this disclosure, described is a RMM (Remote Monitoring and Management) system operatively associated with monitoring and managing a plurality of devices, including ransomware detection. The exemplary RMM system includes: a RMM agent module locally installed on each device and operatively communicating with an OS (operating system) installed on each device; a cloud-based RMM platform operatively communicating with each device RMM agent module, the cloud-based RMM Platform configured to monitor and manage each of the plurality of devices; and a RD (Ransomware Detection) module locally installed on each device and operatively communicating with each respective device RMM agent module, the RD module configured to perform a method of detecting a ransomware-encryption in a plurality of files received by the device, the method including: a) receiving from the RMM platform ransomware monitor configuration data, the ransomware monitor configuration data including one or more watch-items including a list of one or more files, drives, and volumes to monitor for ransomware detection; b) initiating a filewatcher and filewatcher handler to monitor and receive callbacks for create, delete, update, and rename file-events associated with the watch-items, the filewatcher adding each create, delete, update and rename file-event to a metadata watch-item file-event queue, the metadata watch-item file-event queue including raw watch-item file-event data associated with each create, delete, update, and rename file-event associated with the watch-items, the raw-data including one or more of fileobjects and parent folders identified in the watch-item file-event; c) a scheduler processing the metadata watch-item file-event queue according to a preset time-based schedule, the scheduler processing any watch-item file-event data included in the metadata watch-item file-event queue to determine a RW-alert state of the RD module, the scheduler operatively associated with an entropy-analysis-based ransomware detection process to detect potential ransomware-encryption of one or more of the watch-items listed in the watch-item file-event queue and generate the RW-alert state which is representative of a positive or negative detection of ransomware-encryption of one or more of the watch-items listed in the watch-item file-event queue.

In still another embodiment of this disclosure, described is a RD (Ransomware Detection) module operatively associated with a cloud-based RMM (Remote Monitoring and Management) platform for monitoring and managing a plurality of devices and the RD module locally installed on the plurality of devices. The exemplary RD module includes a dynamic link library file and API (Application Programming Interface) configured to perform a method of detecting a ransomware-encryption in a plurality of files received by the device, the method including: a) the RD module receiving from the RMM platform ransomware monitor configuration data, the ransomware monitor configuration data including one or more watch-items including a list of one or more files, drives, and volumes to monitor for ransomware detection; b) the RD module initiating a filewatcher and filewatcher handler to monitor and receive callbacks for create, delete, update, and rename file-events associated with the watch-items, the filewatcher adding each create, delete, update and rename file-event to a metadata watch-item file-event queue, the metadata watch-item file-event queue including raw watch-item file-event data associated with each create, delete, update, and rename file-event associated with the watch-items, the raw-data including one or more of fileobjects and parent folders identified in the watch-item file-event; and c) a RD module scheduler processing the metadata watch-item file-event queue according to a preset time-based schedule, the scheduler processing any watch-item file-event data included in the metadata watch-item file-event queue to determine a RW-alert state of the RD module, the scheduler operatively associated with an entropy-analysis-based ransomware detection process to detect potential ransomware-encryption of one or more of the watch-items listed in the watch-item file-event queue and generate the RW-alert state which is representative of a positive or negative detection of ransomware-encryption of one or more of the watch-items listed in the watch-item file-event queue.

In still another embodiment of this disclosure, described is a computer implemented method for isolating a ransomware-encryption device operative connected to a cloud-based RMM (Remote Monitoring and Management) platform The exemplary method includes: a) in response to a ransomware alert detected on a device, the RMM platform transmitting isolation script to the device; b) the device running the isolation script, the isolation script maintaining the device communication with the RMM platform and disabling the device communication to all other internal and external network locations, the isolation script including: b1) changing the device network information pertinent to the device network connection to the RMM platform from a temporary DHCP (Dynamic Host Configuration Protocol) IP address assignment to a static IP address assignment, the network information including one or more of an internal IP (Internet Protocol) address of one or more active network adapters, inactive network adapters, a subnet mask of the one or more network adapters, a default gateway assignment of the one or more network adapters; b2) nullifying local network and external network information on the device rendering the device unable to access any internal and external network, the nullified local and external network information including one or more of DNS (Domain Name System) server assignments for associated network adapters, default gateways of the associated network adapters, routing table of the device, routing information base of the device, ARP (Address Resolution Protocol) cache and NetBIOS cache; and b3) re-adding to the device routing table the pertinent network information changed to an unchanging DHCP configuration in step b1) directly linking the default gateway IP stored in step b1) to reestablish a network connection from the device to the RMM platform, the re-added network information including one or more of IP addresses for a partner RMM geographical platform, DNS servers, and the devices' HOSTS file; and c) the device communicating to the RMM platform over the RMM platform network connection isolation status information.

In still another embodiment of this disclosure, described is a Ransomware Detection (RD) and Isolation module operatively associated with a cloud-based RMM (Remote Monitoring and Management) platform for monitoring and managing a plurality of devices. The exemplary RD and Isolation module includes: a dynamic link library file and API (Application Programming Interface) configured to perform a method of detecting a ransomware-encryption in a plurality of files received by the device, and the method including: a) the RD module receiving from the RMM platform ransomware monitor configuration data, the ransomware monitor configuration data including one or more watch-items including a list of one or more files, drives, and volumes to monitor for ransomware detection; b) the RD module initiating a filewatcher and filewatcher handler to monitor and receive callbacks for create, delete, update, and rename file-events associated with the watch-items, the filewatcher adding each create, delete, update and rename file-event to a metadata watch-item file-event queue, the metadata watch-item file-event queue including raw watch-item file-event data associated with each create, delete, update, and rename file-event associated with the watch-items, the raw-data including one or more of fileobjects and parent folders identified in the watch-item file-event; c) a RD module scheduler processing the metadata watch-item file-event queue according to a preset time-based schedule, the scheduler processing any watch-item file-event data included in the metadata watch-item file-event queue to determine a RW-alert state of the RD module, the scheduler operatively associated with an entropy-analysis-based ransomware detection process to detect potential ransomware-encryption of one or more of the watch-items listed in the watch-item file-event queue and generate the RW-alert state which is representative of a positive or negative detection of ransomware-encryption of one or more of the watch-items listed in the watch-item file-event queue; d) in response to a positive RW-alert state detected on a device, the RMM platform transmitting isolation script to the device; e) the device running the isolation script, the isolation script maintaining the device communication with the RMM platform and disabling the device communication to all other internal and external network locations, the isolation script including: e1) changing the device network information pertinent to the device network connection to the RMM platform from a temporary DHCP (Dynamic Host Configuration Protocol) IP address assignment to a static IP address assignment, the network information including one or more of an internal IP (Internet Protocol) address of one or more active network adapters, inactive network adapters, a subnet mask of the one or more network adapters, a default gateway assignment of the one or more network adapters; e2) nullifying local network and external network information on the device rendering the device unable to access any internal and external network, the nullified local and external network information including one or more of DNS (Domain Name System) server assignments for associated network adapters, default gateways of the associated network adapters, routing table of the device, routing information base of the device, ARP (Address Resolution Protocol) cache and NetBIOS cache; and e3) re-adding to the device routing table the pertinent network information changed to an unchanging DHCP configuration in step e1) directly linking the default gateway IP stored in step e1) to reestablish a network connection from the device to the RMM platform, the re-added network information including one or more of IP addresses for a partner RMM geographical platform, DNS servers, and the devices' HOSTS file; and f) the device communicating to the RMM platform over the RMM platform network connection isolation status information of the device.

In another embodiment of this disclosure, described is a RMM (Remote Monitoring and Management) system operatively associated with monitoring and managing a plurality of devices, including ransomware detection. The exemplary RMM system includes: a RMM agent module locally installed on each device and operatively communicating with an OS (operating system) installed on each device; a cloud-based RMM platform operatively communicating with each device RMM agent module, the cloud-based RMM Platform configured to monitor and manage each of the plurality of devices; and a RD (Ransomware Detection) module locally installed on each device and operatively communicating with each respective device RMM agent module, the RD module configured to perform a method of detecting a ransomware-encryption in a plurality of files received by the device, the method including: a) receiving from the RMM platform ransomware monitor configuration data, the ransomware monitor configuration data including one or more watch-items including a list of one or more files, drives, and volumes to monitor for ransomware detection; b) initiating a filewatcher and filewatcher handler to monitor and receive callbacks for create, delete, update, and rename file-events associated with the watch-items, the filewatcher adding each create, delete, update and rename file-event to a metadata watch-item file-event queue, the metadata watch-item file-event queue including raw watch-item file-event data associated with each create, delete, update, and rename file-event associated with the watch-items, the raw-data including one or more of fileobjects and parent folders identified in the watch-item file-event; c) a scheduler processing the metadata watch-item file-event queue according to a preset time-based schedule, the scheduler processing any watch-item file-event data included in the metadata watch-item file-event queue to determine a RW-alert state of the RD module, the scheduler operatively associated with an entropy-analysis-based ransomware detection process to detect potential ransomware-encryption of one or more of the watch-items listed in the watch-item file-event queue and generate the RW-alert state which is representative of a positive or negative detection of ransomware-encryption of one or more of the watch-items listed in the watch-item file-event queue; and d) if a RW-alert state is positive, the RD module performing a first remediation method to identify and kill a ransomware process associated with the RW-alert, the first remediation method including: d1) determining all running processes that were started prior to the detection time of a first encrypted file, and started less than a predetermined time before the detection time; d2) of the determined running processes in step d1), determine the currently running process, not included in an exclusion process list, with a highest average accumulated kernel-CPU time and associated with a number of OS handles above a predetermined threshold; and d3) if step d2) and d3) result in an identification of a ransomware process, killing the ransomware process.

In another embodiment of this disclosure, described is a RMM (Remote Monitoring and Management) system operatively associated with monitoring and managing a plurality of devices, including ransomware detection. The exemplary RMM system includes: a RMM agent module locally installed on each device and operatively communicating with an OS (operating system) installed on each device; a cloud-based RMM platform operatively communicating with each device RMM agent module, the cloud-based RMM Platform configured to monitor and manage each of the plurality of devices; and a RD (Ransomware Detection) module locally installed on each device and operatively communicating with each respective device RMM agent module, the RD module configured to perform a method of detecting a ransomware-encryption in a plurality of files received by the device, the method including: a) receiving from the RMM platform ransomware monitor configuration data, the ransomware monitor configuration data including one or more watch-items including a list of one or more files, drives, and volumes to monitor for ransomware detection; b) initiating a filewatcher and filewatcher handler to monitor and receive callbacks for create, delete, update, and rename file-events associated with the watch-items, the filewatcher adding each create, delete, update and rename file-event to a metadata watch-item file-event queue, the metadata watch-item file-event queue including raw watch-item file-event data associated with each create, delete, update, and rename file-event associated with the watch-items, the raw-data including one or more of fileobjects and parent folders identified in the watch-item file-event; c) a scheduler processing the metadata watch-item file-event queue according to a preset time-based schedule, the scheduler processing any watch-item file-event data included in the metadata watch-item file-event queue to determine a RW-alert state of the RD module, the scheduler operatively associated with an entropy-analysis-based ransomware detection process to detect potential ransomware-encryption of one or more of the watch-items listed in the watch-item file-event queue and generate the RW-alert state which is representative of a positive or negative detection of ransomware-encryption of one or more of the watch-items listed in the watch-item file-event queue, wherein, if a RW-alert state is positive, the RMM agent module performs a remediation method to identify and kill a ransomware process associated with the RW-alert, the remediation method including: d1) determining all running processes on the local device which are not included in an exclusion process list; d2) of the determined running processes in step d1), create a process performance counter for each determined running process, the process performance counters tracking I/O (Input/Output) write bytes per second for each process; d3) identifying one or more processes in step d2) with the highest relative counter values, indicating these processes include the most I/O intensive processes and are potential ransomware processes; and d4) killing one or more of the processes identified in step d3).

DETAILED DESCRIPTION

Figure 1:
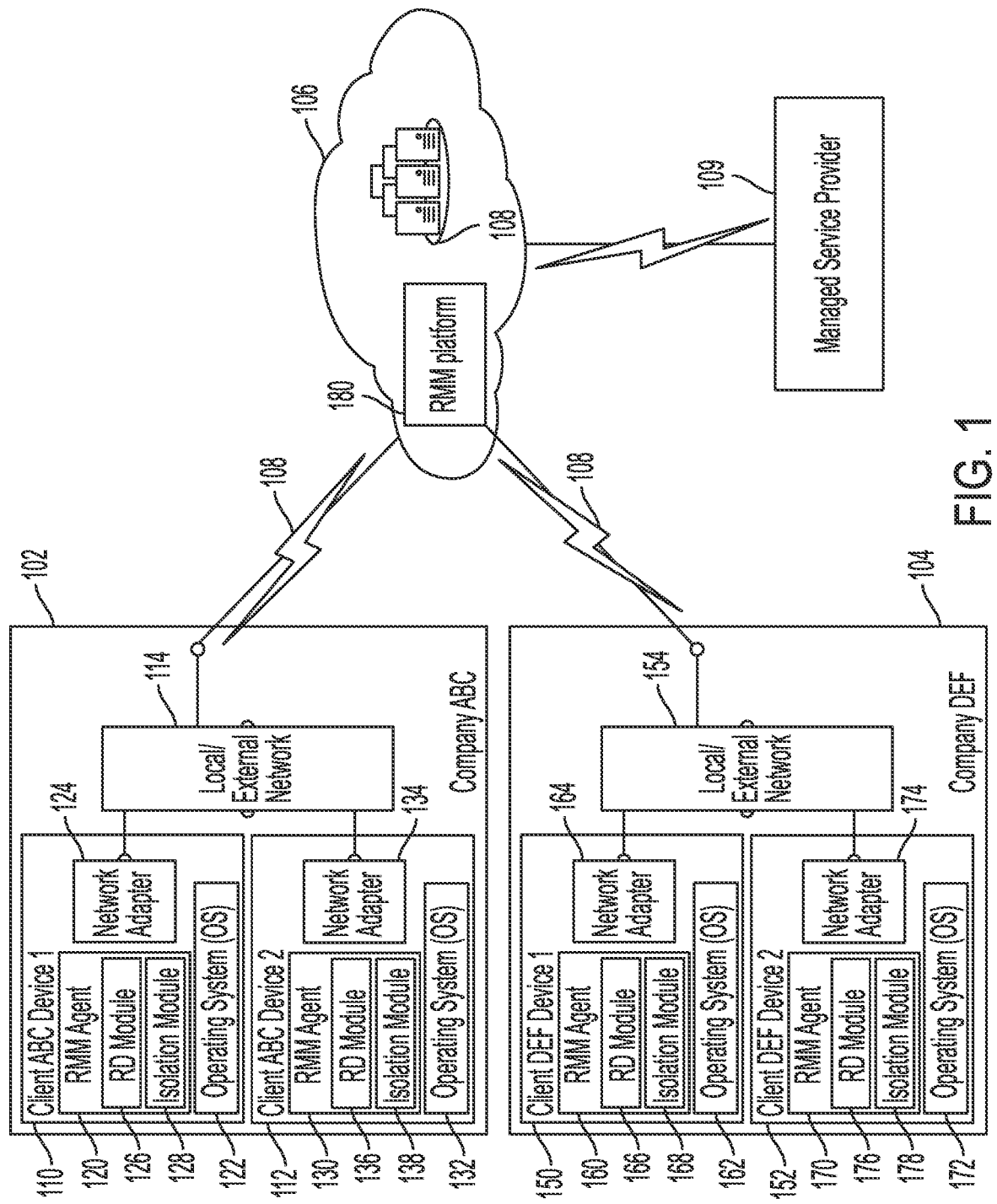
FIG. 1 is a block diagram of a RMM system, including ransomware detection and isolation, the RMM system operatively associated with monitoring and managing a plurality of devices and the RMM system including a RMM agent module locally installed on each device and operatively communicating with an operating system (OS) installed on each device, a cloud-based RMM platform operatively communicating with each device RMM agent module, the cloud-based RMM platform configured for a MSP to monitor and manage each of the plurality of devices, and a Ransomware Detection (RD) and Isolation module locally installed on each device and operatively communicating with each respective device agent module, the RD and Isolation module configured to detect a potential ransomware-encryption in a device and isolate the ransomware affected device according to an exemplary embodiment of this disclosure.

Disclosed herein are methods and systems for ransomware detection and/or isolation of a ransomware-encryption device performed in a Remote Monitoring and Management (RMM) system environment.

Managed service providers (MSP) provide various IT (Information Technology) services to their clients. An MSP monitors and manages the client's IT devices and infrastructure using RMM (Remote Monitoring and Management) tools. In general, RMM is the process of supervising and controlling various IT systems and devices using locally installed agents which can be accessed by the MSP, either via a cloud-based portal or via one or more locally installed communication channels located at a client site. These IT systems and devices may include networks, workstations, servers, desktop computers workstations, laptop PCs, mobile devices, printers, etc. Some of the services MSPs provide to their clients includes, but is not limited to, backup systems (cloud and local), disaster recovery, management and deployment of system/device software, malware detection and remediation, ransomware detection and remediation, etc.

Disclosed herein is a RMM system operatively associated with monitoring and managing a plurality of devices. According to an exemplary embodiment, the RMM system includes a RMM agent module locally installed on each device, a cloud-based RMM platform operatively communicating with each device RMM agent module, and a Ransomware Detection (RD)/Isolation module locally installed on each device. The RD/Isolation module locally detects on a client device a potential ransomware-encryption of one or more files received by the client's device and the RMM system isolates a ransomware affected client device using a locally executed script either provided by the cloud-based RMM platform or locally residing on the client device.

Ransomware is a type of computer malware that installs covertly on a victim's computer, disables the user's access to the computer's files, and then demands a ransom payment in order to restore the user's access. Some types of ransomware may covertly encrypt the computer's files with a secret key, and then demand a ransom payment in order to decrypt the files. This ransom demand may be presented to the user via a pop-up message or dialog box that informs the user his or her files have been ransomware affected with ransomware, and that the user may only restore access to the files by paying a specified amount of money to a certain online location. Since decrypting the encrypted computer files without the secret key may be difficult, expensive, and/or time-consuming for most users, many users may elect to pay the ransom payment in order to restore access. Notable examples of ransomware include CryptoLocker, Reveton, TorrentLocker, and CryptoWall, Locky, Wannacry, Bad Rabbit, Ryuk, Troldesh, Jigsaw, Petya, NotPetya, Goldeneye, GandCrab, Cerber, Crysis, CTB-Locker, KeRanger, LeChiffre, LockerGoga, Spider, TeslaCrypt, ZCryptor.

Some computer users attempt to mitigate the consequences of a malware infection (including ransomware) by periodically backing up the contents of their filesystems according to a regular schedule. If all or part of a filesystem is corrupted, encrypted, or infected by malware (such as ransomware), a user may restore a previous backup of the filesystem. While the user would lose all changes made to the filesystem since the previous backup, this is generally preferable to losing all or most of the files stored on the filesystem.

However, computers that periodically backup the contents of filesystems generally make space in memory for new backups by deleting older backup versions. For example, computers may delete one or more of the oldest, previously stored backup versions in order to make space for new backup versions. This process of deleting the oldest, previously stored backup versions may be referred to as "aging out" older backup versions. Knowing this, some types of ransomware will not announce its presence in a filesystem (e.g., by demanding the ransom payment) until a certain period of time (e.g., one week) has passed since the initial RW infection. This waiting period may ensure that all uninfected backup versions of a filesystem will have aged out before the user realizes that his or her files are infected.

Some types of ransomware may also take a significant amount of time to propagate throughout a filesystem. By not announcing its presence in a filesystem for a certain period of time, the ransomware can ensure that all or most of a filesystem is infected before the user becomes aware of the problem. Furthermore, some types of ransomware are programmed to attack outside of normal working hours when employees and/or IT staff are not working, for example weekends or outside normal working hours. This situation can make it difficult and time consuming to determine when an actual attack occurred, and consequently which previous backup to restore a system.

The present disclosure generally provides a design and implementation of a ransomware detection and/or isolation and/or remediation methods and systems that are an integrated part of a RMM system, wherein a RD/Isolation module is locally installed on a client's device, thereby providing a local and relatively rapid detection of potential ransomware on a device without the need to store and process potential target files remotely for ransomware detection. The local nature of the disclosed ransomware detection and isolation methods and systems, as compared to remote-server-based detection methods, provides an effective ransomware defense which detects potential ransomware attacks on a device, i.e., locally, prior to any infected/encrypted files being shared via a local or external network. In other words, the disclosed ransomware detection and isolation methods and systems effectively provide a real time solution for detecting ransomware.

According to an exemplary embodiment, a relatively small self-contained module installed on a client device which communicates with an RMM platform includes both a handler for OS file-events (windows/mac), and execution of ransomware detection methods as further described, at least in part, in commonly assigned patent applications U.S. Pub. No. 2018/0107824 filed Oct. 17, 2017 and titled "SYSTEMS AND METHODS FOR DETECTING RANSOMWARE INFECTION"; U.S. Ser. No. 16/431,188 filed Jun. 4, 2019 and titled "METHODS AND SYSTEMS FOR DETECTING A RANSOMWARE ATTACK USING ENTROPY ANALYSIS AND FILE UPDATE PATTERNS"; and U.S. Ser. No. 16/840,665 filed Apr. 6, 2020 and titled "METHODS AND SYSTEMS FOR DETECTING RANSOMWARE ATTACK IN INCREMENTAL BACKUP,"

According to an exemplary embodiment, the RMM calls a RD dll call function to monitor and detect ransomware on the device itself, without having to go through a server. Specific benefits associated with this arrangement include, but are not limited to: 1) elimination of a need for a database for processing file-events because the processing of file-events happens in almost real time, locally; 2) faster ransomware detection as a result of eliminating network/server transmission delay; 3) faster ransomware detection as a result of increasing the rate/frequency of relevant file-event watching to, for example, 30 s or less (the time between deltas). According to one exemplary embodiment, the time between deltas is 2 seconds. If ransomware is detected, the RMM host application can take appropriate actions, including providing isolation script to the device agent to run locally thereby providing isolation of the infected machine from internal and external networks and drives. According to an exemplary embodiment, the isolation script run by the device agent closes all ports to the device, except for a dedicated communication network channel to the RMM platform to provide MSP access to the infected device for further action by the MSP. If the device is being backed up when ransomware is detected, in many cases, the backup is stopped before any damage or corruption can be done to the backup data.

A file-sync and share service can be especially sensitive to ransomware attacks, because the files being encrypted by the ransomware are quickly disseminated to other users via a cloud server, potentially leaving a company without all its important documents, spreadsheets etc., until a restore from previous versions has been performed and completed. If an attack can be detected quickly, the infected device can be disconnected automatically, and actions can be taken to revert the changes made by this device.

While the ransomware detection exemplary embodiments described herein are of particular importance to RMM systems, backup products/services and file-sync-share products/services, it is to be understood that the disclosed ransomware detection and isolation methods and systems are also applicable to other products/services/systems that include the processing and/or storage of computer related files, e.g., file transfer/storage applications, other computer file utility applications, etc.

As disclosed, in part, in commonly assigned patent applications U.S. Pub. No. 2018/0107824 filed Oct. 17, 2017 and titled "SYSTEMS AND METHODS FOR DETECTING RANSOMWARE INFECTION"; U.S. Ser. No. 16/431,188 filed Jun. 4, 2019 and titled "METHODS AND SYSTEMS FOR DETECTING A RANSOMWARE ATTACK USING ENTROPY ANALYSIS AND FILE UPDATE PATTERNS"; and U.S. Ser. No. 16/840,665 filed Apr. 6, 2020 and titled "METHODS AND SYSTEMS FOR DETECTING RANSOMWARE ATTACK IN INCREMENTAL BACKUP," the disclosed exemplary RMM ransomware detection methods and systems use several types of analysis to determine whether or not a ransomware attack or infection is occurring.

At a high level, the methods and systems exploit features of ransomware to detect its effects on a filesystem. First, ransomware tends to target only specific file types (e.g., ransomware target file types) within certain filesystem directories (e.g., active user directories) for infection, while leaving other types of files and/or other directories unaffected. Second, since ransomware generally encrypts the files that it infects, and since encryption will increase the randomness of an infected file's contents, a ransomware-encryption can be detected by measuring the entropy (i.e., randomness or information density) of a file, or a collection of files. As used herein, "entropy" refers to any measure or indication of randomness or information density, and references to the "entropy" of one or more files refers to any measure or indication of the randomness or information density of all or part of the one or more files' contents. Entropy can be measured or indicated using various types of metrics or tests, including, but not limited to, Shannon Entropy, Monte Carlo pi approximations, Chi-Squared tests, or by computing one or more mean byte values. If the measured entropy indicates a high degree of randomness in the contents of the file (or collection of files), this can be an indication that the file(s) have been infected with ransomware. Third, ransomware tends to exhibit other characteristics which are described below.

The disclosed ransomware detection entropy calculations may use or omit certain parts of files. High and low entropies for portions of files are calculated and compared to thresholds, and also examined as ratios. The entropy analysis disclosed can be configured to be file size dependent to provide more precise entropy values. A weighted hint in the update analysis is provided by a relatively small database maintained with a subset of known, common filetypes and associated extensions, and an indication of the use of particular file types for a file, as well as whether the file types are known or unknown. A file update pattern is analyzed on a server by means of a "watcher," that monitors file commands arriving from a computing device via its agent module, according to an exemplary embodiment, which communicates with the server. If an update pattern receives a 'score' higher than a certain threshold, an alert is triggered. False-positive detections of encrypted files can be minimized further with the use of an exclusion list that includes known encrypted file types that are not considered a threat.

After a file is determined to be encrypted, the watcher can monitor the behavior or characteristics of other files and other file commands, encrypted and unencrypted, to determine if a ransomware attack or ransomware-encryption is potentially occurring. The 'other files' monitored are generally associated in some manner with the file determined to be encrypted and include, but are not limited to: 1) files received by a server from an associated agent module or client device for synchronization, sharing and/or storage, 2) files received or associated with a particular or common time frame or location, 3) files sharing a common processing queue, etc. The 'other file commands' monitored include, but are not limited to, one or more of, copy, replace, delete and move file commands.

The essential characteristics of a ransomware attack (RWA) can be described as including, but not limited to, the following:

a) files containing user data are the main target (as opposed to system files or files that can easily be restored by reinstalling, etc.);

b) targeted files are replaced by encrypted files, with a new name and/or extension. Ransomware notes are often added to each folder;

c) the encryption of files happens in rapid succession, or at least in bursts of hundreds of files; and d) a strong encryption algorithm is used.

The components of the RWA detection methods and systems described herein include:

1) a method for detecting if a file is encrypted; and 2) a method for analyzing a file update pattern associated with a plurality of files, in as close to real-time as possible.

It is the combined use of these two methods that generates a strong indicator of a ransomware attack in progress.

Detection of Encrypted Files

Files that have been encrypted by a strong encryption algorithm will exhibit a high 'randomness' of its content. Shannon entropy is a well-known method in information theory for measuring the level of randomness, or disorder of a sequence of values. According to the disclosed encryption detection method, files are analyzed at the byte-level, so the result of computing entropy on the content of a file yields a number between 0 and 8, where 8 indicates the highest level of randomness. Highly compressed files, e.g., zip archives, also exhibit high randomness, but they usually have some level of internal structure rather than being completely random.

An issue associated with computing entropy for a file, and similar methods for measuring randomness, is that existing entropy calculation methods are effectively "low-pass filters." In other words, the larger the files are, the less importance is given to small local areas that contains some kind of structure or relatively nonrandom information. Consequently, ordinary compressed files which are not associated with a will often be computed by existing entropy calculation methods as having a very high entropy; often between 7.98 and 8.00. According to this disclosure and the exemplary embodiments described herein, methods and systems of calculating the entropy and/or randomness are provided which account for the low frequency characteristics and high frequency characteristics of the byte value distributions associated with a file, thereby providing a more intelligent and accurate ransomware detection method which considers small local areas with some kind of internal structure in order to eliminate false-positive detections of a RWA based on a non-threating highly compressed file, e.g., zip archives.

With reference to FIG. 1, shown is a block diagram of a RMM system, including ransomware detection and isolation as disclosed herein, the RMM system operatively associated with monitoring and managing a plurality of devices. The RMM system includes a RMM agent module locally installed on each device which operatively communicates with an operating system (OS) installed on each device, a cloud-based RMM platform operatively communicating with each device RMM agent module, the cloud-based RMM platform configured for a MSP to monitor and manage each of the plurality of devices, and a Ransomware Detection (RD) and Isolation module locally installed on each device and operatively communicating with each respective device agent module, the RD and Isolation module configured to detect a potential ransomware-encryption in a device and isolate the ransomware affected device according to an exemplary embodiment of this disclosure.

The RMM system illustrated, as an example, includes Company ABC site 102; a Company DEF site 104; a common Cloud Platform 106; and an Internet/External Network 108 which provides communications to RMM Platform 180 and a Managed Service Provider (MSP) 109. While the RMM system described herein is architecturally represented by FIG. 1, it is to be understood the RMM system is scalable to 10s, 100s and 1000s of client sites. In addition, each client site is not limited to a Device 1 and Device 2 as shown, but can include 10s, 100s and 1000s of devices, each device including a RMM agent as will be described herein.

Company ABC site 102 includes Client ABC Device 1 (Local Endpoint) 110; Client ABC Device 2 (Local Endpoint) 112; and a Local/External Network 114 which enables communications on a local network as well as an external network. Client ABC device 1 includes RMM Agent 120; Operating System (OS) 122; Network Adapter 124; RD Module 126; and Isolation Module 128. Client ABC device 2 includes RMM Agent 130; Operating System (OS) 132; Network Adapter 134; RD Module 136; and Isolation Module 138.

Company DEF site 104 includes Client DEF Device 1 (Local Endpoint) 150; Client DEF Device 2 (Local Endpoint) 152; Local/External Network 154 which enables communications on a local network as well as an external network. Client DEF device 1 includes RMM Agent 160; Operating System (OS) 162; Network Adapter 164; RD Module 166; and Isolation Module 168. Client DEF device 2 includes RMM Agent 170; Operating System (OS) 172; Network Adapter 174; RD Module 176; and Isolation Module 178.

In operation, a MSP 109 accesses Company ABC devices and Company DEF devices using a RMM platform portal which is hosted by a cloud-based infrastructure service, such as but not limited to, Amazon Web Services, Microsoft Azure, and Google Cloud. The RMM platform portal and associated RMM MSP user interface provide the MSP with the ability to monitor and manage client devices, including patch management, automation of tasking for devices utilizing libraries of scripts, generating device/site IT reports, remote access of devices, etc. In addition, the RMM portal provides the MSP with the ability to schedule and initiate backups of client devices if the RMM is integrated with a backup cloud-based service.

Figure 2:
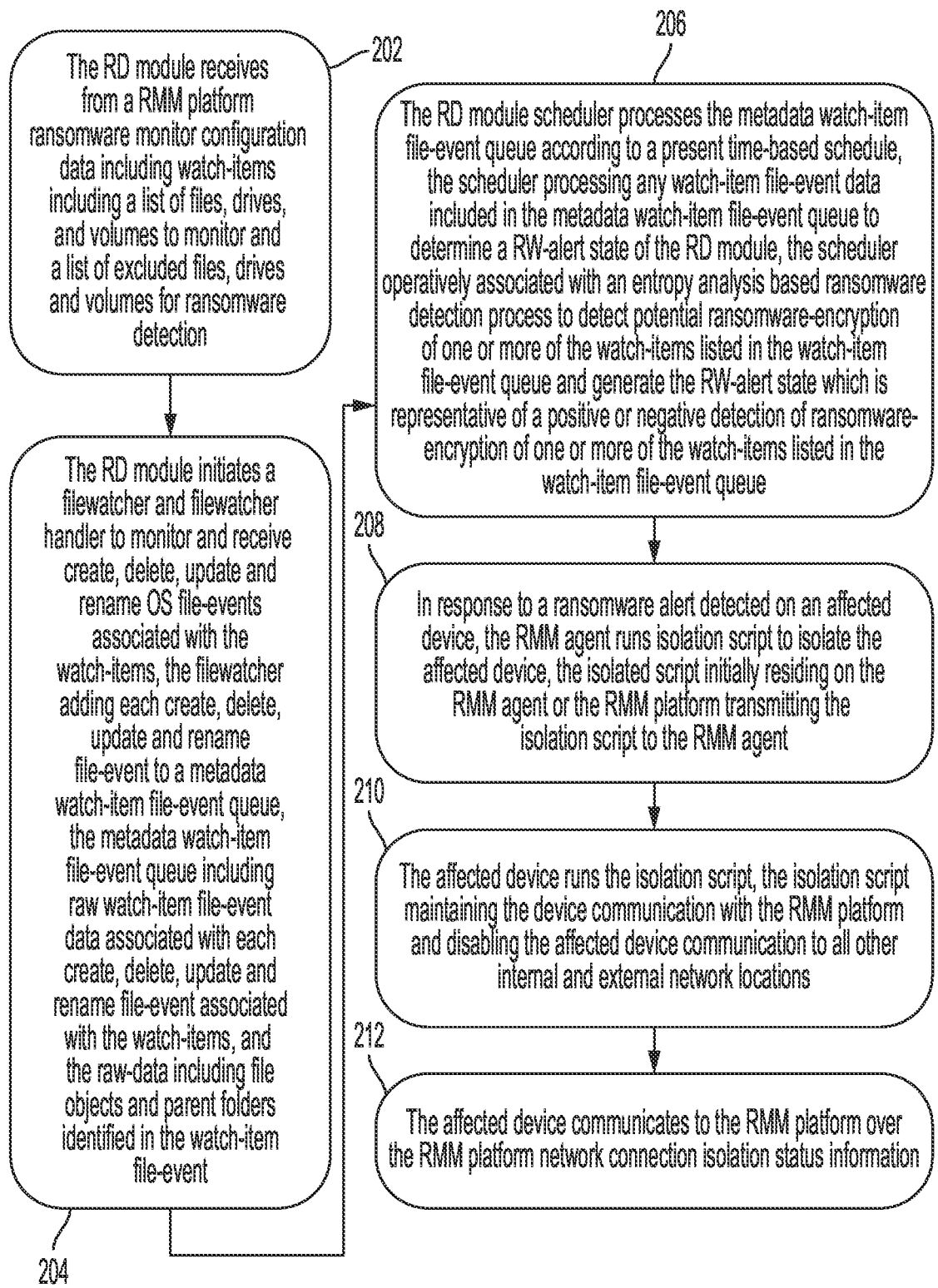
FIG. 2 is a flow chart of a ransomware detection and isolation method according to an exemplary embodiment of this disclosure.

With reference to FIG. 2, shown is an operation flow chart of a ransomware detection and isolation method incorporated into the RMM system shown in FIG. 1. The description provided below references Client ABC Device 1, however it is to be understood that the operation of the RMM RD module and/or Isolation module is applicable to any client device in the RMM system.

At step 202, the RD module 126 receives from a RMM platform 180 ransomware monitor configuration data including watch-items including a list of files, drives, and volumes to monitor and a list of excluded files, drives and volumes for ransomware detection. During this step, the RD module 126 communicates with the RMM agent 120 utilizing an API (Application Programming Interface) which in turn communicates via network adapter 114 and a wide area network 108, such as the internet, to the cloud-based RMM platform 180 hosted by a cloud-based infrastructure service 106.

At step 204, the RD module 126 initiates a filewatcher and filewatcher handler to monitor and receive create, delete, update, and rename OS file-events associated with the watch-items, the filewatcher adding each create, delete, update and rename file-event to a metadata watch-item file-event queue, the metadata watch-item file-event queue including raw watch-item file-event data associated with each create, delete, update, and rename file-event associated with the watch-items, and the raw-data including fileobjects and parent folders identified in the watch-item file-event. According to the exemplary embodiment described, the OS file events are provided by the I/O of an OS, such as a MICROSOFT WINDOWS NET framework, i.e., the filewatcher and the RD module filewatcher handler accesses the filewatcher data provided by the OS filewatcher I/O. While the exemplary embodiment described herein is in the context of a WINDOWS-based client device operating system, it is to be understood that other client device operating systems, such as macOS, UNIX, and Linux, are applicable At step 206, the RD module 126 scheduler processes the metadata watch-item file-event queue according to a preset time-based schedule, such as every 10 seconds, the scheduler processing any watch-item file-event data included in the metadata watch-item file-event queue to determine a RW-alert state of the RD module. To determine a RW-alert state, the RD module scheduler is operatively associated with an entropy-analysis-based ransomware detection process to detect potential ransomware-encryption of one or more of the watch-items listed in the watch-item file-event queue and generate the RW-alert state which is representative of a positive or negative detection of ransomware-encryption of one or more of the watch-items listed in the watch-item file-event queue.

At step 208, in response to a ransomware alert detected by the RMM agent 120 on a ransomware affected device, the RMM agent 120 runs isolation script to isolate the ransomware affected device, the isolated script initially residing on the RMM agent or the RMM platform 180 transmitting the isolation script to the RMM agent.

At step 210, the ransomware affected device runs the isolation script, the isolation script maintaining communication of the ransomware affected device with the RMM platform and disabling all communications of the ransomware affected device with other internal and external network locations.

At step 212, the ransomware affected device 110 communicates to the RMM platform 180 over the maintained RMM platform network connection isolation status information.

As will be further described below, steps 210 and 212 effectively isolate the affect device from any local and external network communication with any other device, thereby preventing the corruption/infection of other networked devices. In operation, this includes:

a) changing the affected device network information pertinent to the affected device network connection to the RMM platform from a temporary DHCP (Dynamic Host Configuration Protocol) IP address assignment to a static IP address assignment, the network information including one or more of an internal IP (Internet Protocol) address of one or more active network adapters, inactive network adapters, a subnet mask of the one or more network adapters, a default gateway assignment of the one or more network adapters;

b) nullifying local network and external network information on the affected device rendering the affected device unable to access any internal and external network, the nullified local and external network information including one or more of DNS (Domain Name System) server assignments for associated network adapters, default gateways of the associated network adapters, routing table of the affected device, routing information base of the affected device, ARP (Address Resolution Protocol) cache and NetBIOS cache; and c) re-adding to the affected device routing table the pertinent network information changed to an unchanging DHCP configuration in step b1) directly linking the default gateway IP stored in step b1) to reestablish a network connection from the affected device to the RMM platform, the re-added network information including one or more of IP addresses for a partner RMM geographical platform, DNS servers, and the affected devices' HOSTS file.

Figure 3:
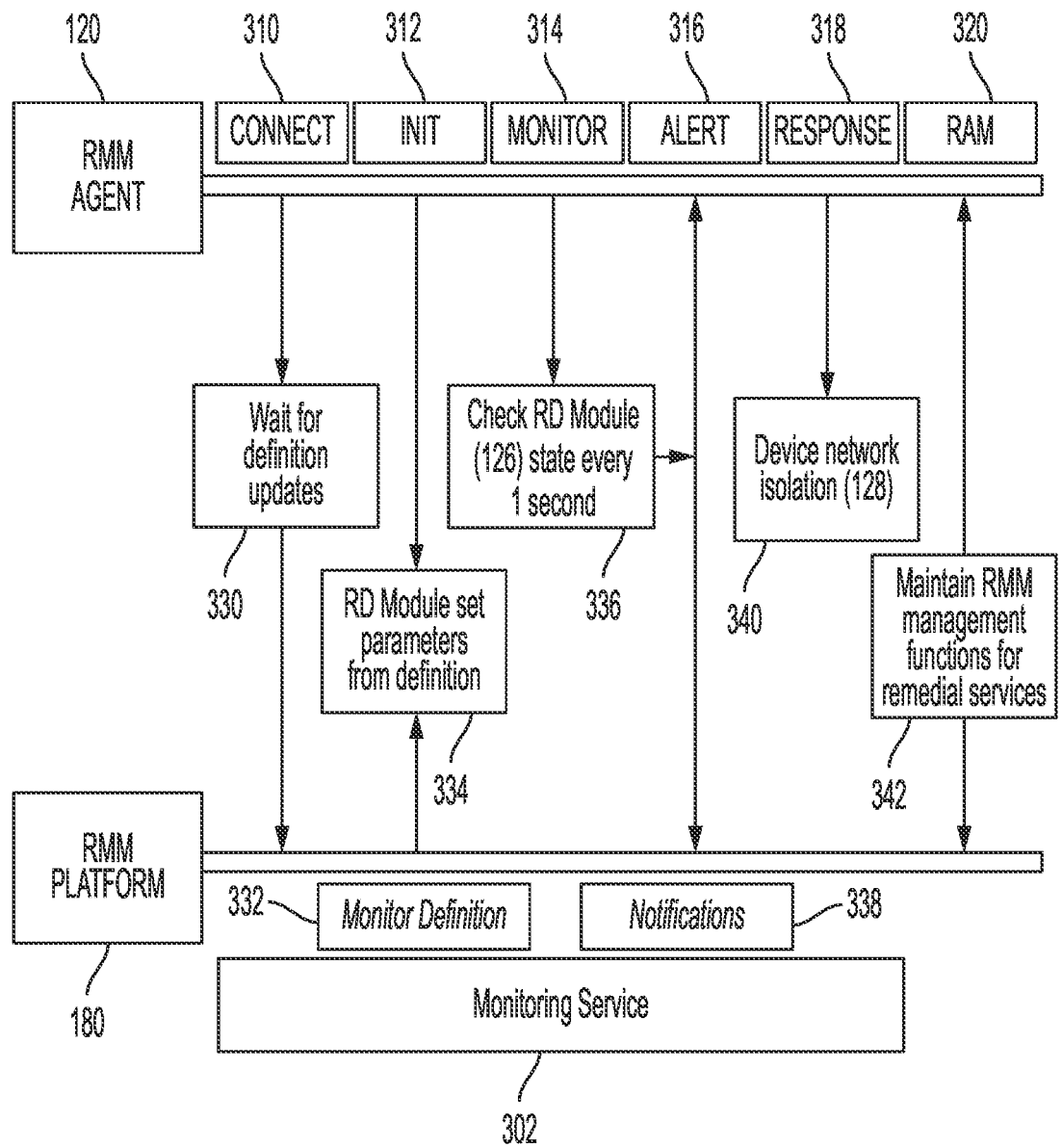
FIG. 3 is a block diagram of a RMM system architecture, including ransomware detection and isolation, the RMM system operatively associated with monitoring and managing a plurality of devices and the RMM system including a RMM agent module locally installed on each device and operatively communicating with an operating system (OS) installed on each device, a cloud-based RMM platform operatively communicating with each device RMM agent module, the cloud-based RMM platform configured to monitor and manage each of the plurality of devices, and a Ransomware Detection (RD) and Isolation module locally installed on each device and operatively communicating with each respective device agent module, the RD and Isolation module configured to detect a potential ransomware encryption in a device and isolate the ransomware affected device according to an exemplary embodiment of this disclosure.

With reference to FIG. 3, shown is a block diagram of a RMM (Remote Monitoring and Management) system, including ransomware detection and isolation, according to an exemplary embodiment of this disclosure. The RMM system is operatively associated with monitoring and managing a plurality of devices and the RMM system includes a RMM agent module locally installed on each device and operatively communicating with an operating system (OS) installed on each device, and a cloud-based RMM platform operatively communicating with each device RMM agent module. The cloud-based RMM platform is configured to monitor and manage each of the plurality of devices, and a Ransomware Detection (RD) module is locally installed on each device and operatively communicates with each respective device agent module. The RD and Isolation module detects a potential ransomware-encryption and isolates an infected device as described below.

Description of Steps:

1) 310 The RMM agent 120 connects to RMM platform 180 and requests/receives a ransomware definition 330/334 from a ransomware monitor definition database 332. The ransomware definition includes, but is not limited to, configuration data including one or more watch-items including a list of one or more files, drives, and volumes to monitor for ransomware detection. In addition, the configuration data may include an exclusion list of one or more files, drives, and volumes to exclude from monitoring for ransomware detection. The ransomware monitor configuration data can be updated on the RMM Agent at any time via the RMM platform.

2) 312 The RMM agent 120 initiates the locally installed device RD module 334 with the supplied configuration data and the RD module 334 begins monitoring watch-items including the provided list of files, drives and volumes for ransomware, for example, using entropy-based methods to determine the likelihood of encryption of a plurality of files, and file update pattern analysis. In the event the RD module 334 detects a possible ransomware-encryption or Ransomware Attack (RWA), the RD module 334 sets a detection state of the module to indicate a RW-alert.

3) 314 The RMM Agent 120 monitors the ransomware detection state of the RD module held in a memory according to a preset time-based schedule provided by the RMM platform provided configuration data or other manner. For example, every 1 second, but practically can be any time specified, for example, 1-20 seconds 336.

4) 316 In the event the RD-module state indicates a RW-alert, the RW-alert is reported to the RMM platform over a network to notify the MSP/monitoring service 302 using the configuration data provided by monitoring service configuration data 338. The RW-alert report includes, but is not limited to, one or more of the ransomware affected directories, a confidence metric value or representation that a RWA has occurred, file extensions affected, time of the meta and actual alert. The RMM platform notifies people and systems as configured in RMM monitoring configuration data 338.

In addition, in the event the RD-module state indicates a RW-alert, the RMM agent 120 initiates a response 318, including device network isolation 340. In other words, the ransomware affected device is isolated from all internal and external networks, with the exception of maintaining a network connection with the RMM platform 180, for example, via the internet to maintain RMM management functions for remedial service 342.

Provided below is a code snippet, according to an exemplary embodiment of this disclosure, for a RMM Agent module including RWA detection and isolation methods as described herein.

```
let createObservable perfmonInstances perfmon (definitions: List<RansomWare>) ( ) =
   Observable.Create
      (fun (obs:lobserver<_>) ->
         let api = RWDetectCore.RwDetectAPI(true, RWDetectCore.RwDetectAPI.Ostype.Windows)
         let alertSubject = new Reactive.Subjects.Subject<_> ( )
         do api.SubscribeAlertNotification (fun_ -> alertSubject.OnNext( ))
         let topIO = IOMonitoring.topThreeIOProcessInstances perfmonInstances perfmon
         do savedAPI.Post (SaveAPI (api.topIO))
         do definitions |> Array.ofSeq |> (setAPIInputs api)
         let apiDisposable = Disposable.Create (fun ( ) -> try api.RwDetectExit ( ) with |_ -> ( ))
         api.setExternalLogger (Logging.Logger ( ))
         Observable.combineLatest
            (Observable.observeOn (Reactive.Concurrency.Scheduler.Default) alertSubject)
            (Observable.interval (TimeSpan.FromSeconds 1.))
         |> Observable.map
            (fun_ ->
               let alert = api.getAlertInfo( )
               {
                  state = alert.alertState
                  confidenceFactor = alert.confidencefactor
                  rwextension = alert.rwextension
                  mentalities = alert.metaAlertTime
                  alertTime = alert.alertTime
                  deleted = List.ofSeq alert.deletedFiles
                  encrypted = List.ofSeq alert.possibleEncryptedFiles
                  watchPaths =
                     defaultArg (api.getWatchPaths ( ) |> Option.ofObj |> Option.map List.ofSeq)
                     [ ]
               }
            })
         |> Observable.distinctUntilChanged
         |> Observable.subscribeWithCallbacks obs.OnNext obs.OnError obs.OnCompleted
         |> (fun t -> new CompositeDisposable([t; apiDisposable ]) :> Idisposable))
   |> Observable.publish
   |> Observable.refCount
```

Figure 4:
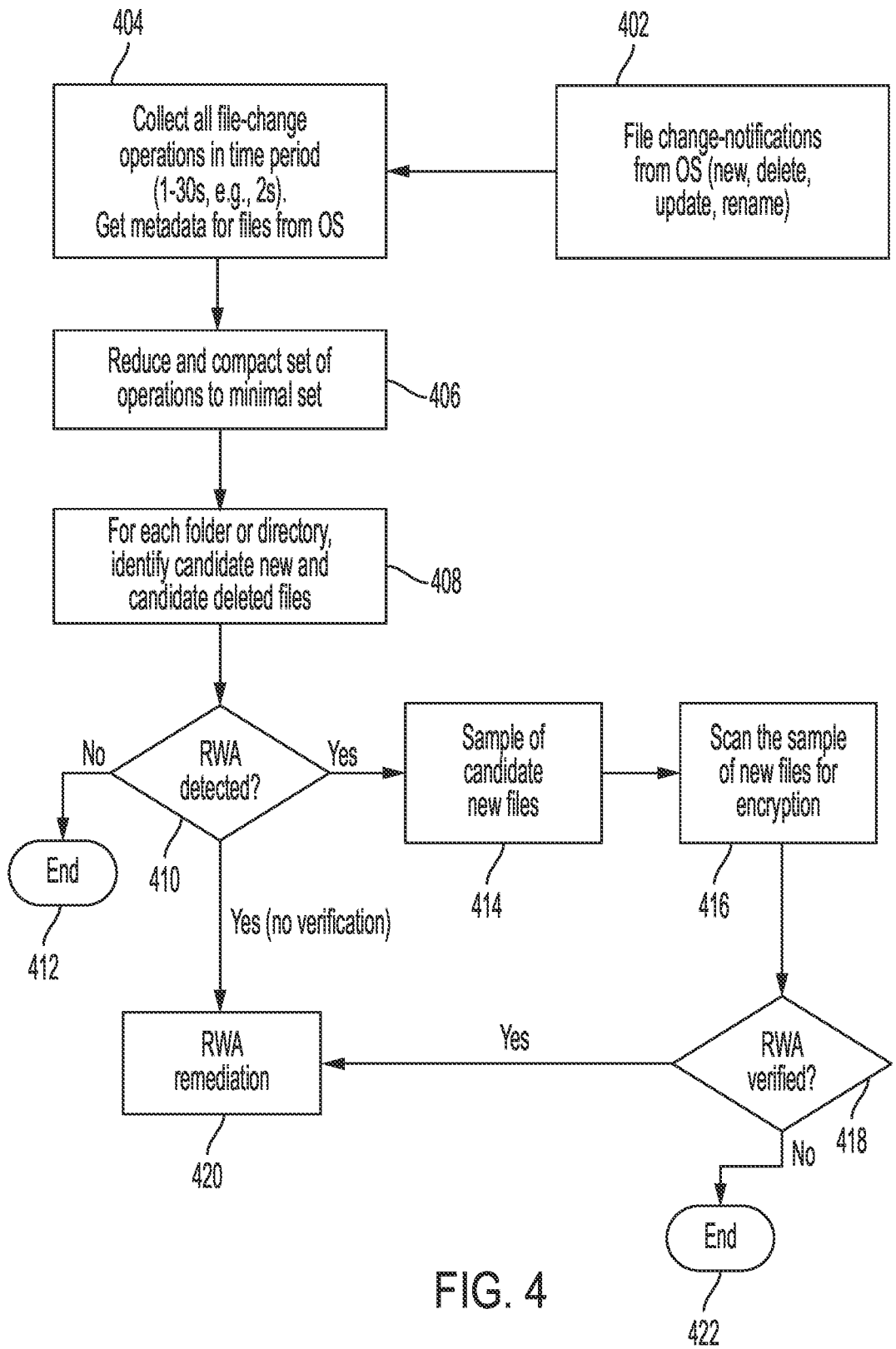
FIG. 4 is a flow chart of a ransomware detection method incorporated into a RD module according to an exemplary embodiment of this disclosure.

With reference to FIG. 4, shown is a flow chart of a ransomware detection method incorporated into a RD module according to an exemplary embodiment of this disclosure. Specifically, the ransomware detection shown includes one example of a ransomware detection method implemented into the RD module 336, the ransomware detection method including the following steps:

At step 402, the RD method receives/accesses file change-notifications from the OS (new, delete, update, rename).

At step 404, the RD method collects all file-change operations [provided by the OS for a predetermined time-period, for example 1-30 s, and gets metadata for the respective files from the OS.

At step 406, the RD method reduces and compacts the OS provided set of operations to a minimal set.

At step 408, the RD method identifies for each folder or directory, candidate new and candidate deleted files.

At step 410, the RD method determines if a potential RWA is detected.

If no potential RWA is detected, at step 412, the RD method ENDs.

If a potential RWA is detected, at step 414, the RD method generates a sample of candidate new files for further processing for RWA detection.

At step 416, the RD method scans the sample of new files for encryption.

At step 418, if the sample of new files are determined to not be encrypted, the method proceeds to step 422 and ends. If the sample of new files are determined to be encrypted, the method verifies a potential RWA has occurred and proceeds to step 420.

At step 420, the RD method initiates RWA remediation for the affected device.

At step 422, the RD method Ends.

Provided below is a code snippet, according to an exemplary embodiment of this disclosure, for a RWA detection method as described herein.

```
// Do this every n seconds, if the raw event-queue is not empty
      DateTime startTimeD = DateTime.Now;
      List<FileWatchItem> listNew = fwList.CompactList(fwList.emptyListRaw( )); // Collapse events to
minimum: rawlist -> compactList
      durCompact = (int)(DateTime.Now - startTimeD).TotalMilliseconds;
      if (fwList.fileListCompact == null || fwList.fileListCompact.Count == 0)
           fwList.fileListCompact = listNew;
         else
           fwList.fileListCompact = fwList.fileListCompact.Concat(listNew).Tolist( );
      startTimeD = DateTime.Now;
      List<FileWatchItem> useList = (fwList.ss == null) ? fwList.fileListCompact : listNew;
      ResultState.eventResult res = fwList.evaluateMetaData(useList, inAlertState); // evaluate meta-data,
compactList -> alertState -> -init ss;
      durEval = (int)( DateTime.Now - startTimeD).TotalMilliseconds;
      if (!(rwAlert.alertState == RwAlert.AlertState.FullAlert) && res == ResultState.eventResult.alert)
      { /* Metadata-alert- check for full alert by evaluating file-content of sample */
```

```
        try
        {
            rwt.pauseExecution( );  // Pause handling of incoming events
            rwAlert.setMetaAlertInfo(fwList.ss);
            startTimeD = DateTime.Now;
            res = fwList.evaluateFileContent( );
            if (res == ResultState.eventResult.alert)
            { /* Full alert , RWA-detected */
                checkNewProcessesTimely(true);
                rwAlert.proccesNames = findNewProcceses(fwList.ss.getDetectionTime( ), 45 * 1000,
            fwList.ss.getDetectionTime( ));
                rwAlert.setFullAlert(fwList.ss);   // Extract alert-info
                27as Alert = true;
                doAlertCallback( );  // Notify RMM with alert-info
            }
            durEvalFile = (int)(DateTime.Now - startTimeD).TotalMilliseconds;
        }
catch (Exception e)
{
        LoggerMgt.LogException("RwDetectAlert-fullalert", e);
    }
finally {
        if (28as Alert)
            rwt.pauseExecutionWhileAlert( );  // State can hereafter only be cleared via api.
        Else
            rwt.resumeExecution( );  // Resume handling of events
    }
}
 else
{
        if (fwList.ss == null)
            clearListTimely( );
}
```

Figure 5:
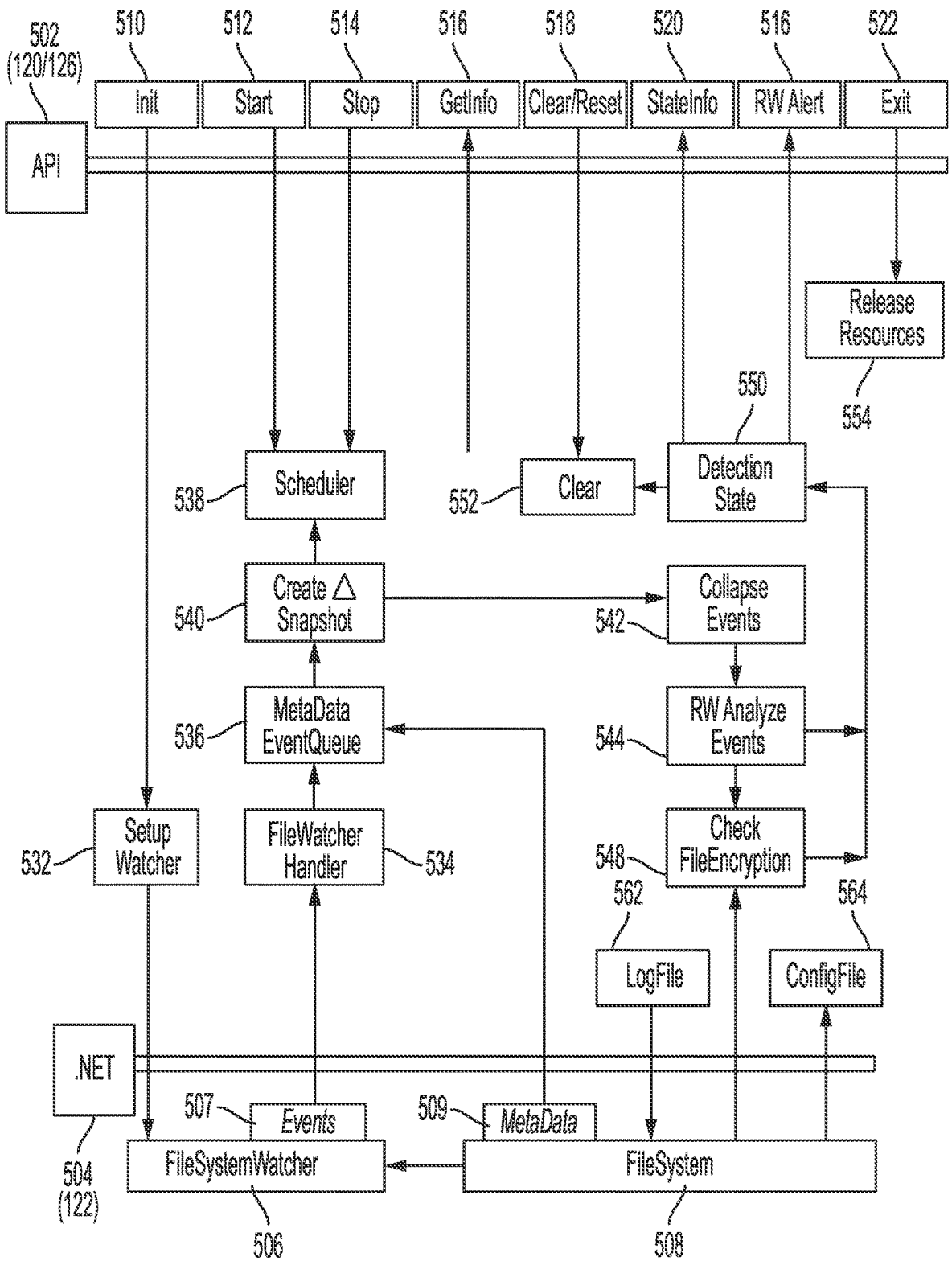
FIG. 5 is a block diagram of a RMM system operatively associated with monitoring and managing a plurality of devices, including ransomware detection, the RMM system including a RMM agent module locally installed on each device and operatively communicating with an OS installed on each device; a cloud-based RMM platform operatively communicating with each device RMM agent module, the cloud-based RMM Platform configured to monitor and manage each of the plurality of devices; and a RD module locally installed on each device and operatively communicating with each respective device RMM agent module.

With reference to FIG. 5, shown is a block diagram of another RMM (Remote Monitoring and Management) system operatively associated with monitoring and managing a plurality of devices, including ransomware detection, the RMM system including a RMM agent module locally installed on each device and operatively communicating with an OS (operating system) installed on each device; a cloud-based RMM platform operatively communicating with each device RMM agent module, the cloud-based RMM Platform configured to monitor and manage each of the plurality of devices; and a RD (Ransomware Detection) module locally installed on each device and operatively communicating with each respective device RMM agent module.

As shown, the RM agent API 502 (120/126) includes a RD module 1/O interface for the RMM agent to control the RD module to Initialize 510, Start 512, Stop 514, Clear/Rest 518 the RD-module state and Exit 522. In addition, the RD module 1/O interface includes the ability for the RD module to request information, i.e., GetInfo 516, from the RMM agent 120, provide RD-module state information 520 to the RMM agent, and provide a RW-alert signal to the RMM agent module. Other software components of the RD module include: Setup Watcher 532; FileWatcher Handler 534; Metadata EventQueue 536; Scheduler 538; Create Snapshot 540; Collapse Events 542; RW Analyzer 544; Check File Encryption 548; RD module State detector 550; Release Resources 554; LogFile 562 and ConfigFile 564.

Also, as shown, the OS I/O 504 (e.g., .NET) provides the RD module access to information, including MetaData 509 related to OS file events 506/507 associated with the OS File System 508 using the OS FileSystemWatcher 506.

Setup FileWatcher 532 to Monitor System-Filechange File-Events

A list of folders/drives to watch is supplied, for example: {"c:\", "d:\" "x:\" }. A SystemFileWatcher is initialized for each watch-item, with callback functions in FileWatcher-Handler.

A list of subfolders to be excluded is supplied, for example: {"AppData", "Windows", "/$recycle.bin","Program Files" . . . }. For a WINDOWS-based OS, subfolders cannot be excluded from the SystemFileWatcher, so file-events from these folders are filtered out in the FileWatcherHandler 534.

FileWatcherHandler 534

Receives callbacks for create, delete, update, rename file-events, for updates in the folders specified above. File-events are ignored if inside excluded folders.

File-events are added to the MetaDataEventQueue 536

Metadata File-Event Queue 536

This queue contains the raw-event data. Additional meta-data-info is retrieved, and misc. in-memory lookup-tables are maintained as events are added. Fileobjects and parent folders identified in the events are assigned ids. Simple collapsing of update-events to a single file is also performed. In other words, a new file on a volume will result in create+update+update . . . file-events which are collapsed to a single create file event.

Scheduler 538

The Scheduler generates timer events every (preset) number of seconds, for example, but not limited to, every 10 s. At each timer event, the Scheduler checks the Metadata Event queue 536, and if it contains any information, it extracts the info (delta), and clears the Metadata Event Queue 536. Then the RD module processes the information (steps Collapse Events 542, RW Analyze Events 544 and Check FileEncryption 548) until it reaches a conclusion indicating an "abort", "continue" or "RW-alert" RD-module state 520.

In most cases, the abort conclusion is reached in the very beginning of this process. If the process is aborted the RD-module state 520 is cleared 518/552.

In some cases, a conclusion cannot be reached, so the RD-module state 520 carries over to the next timer event and delta.

If the conclusion is a RW-alert, a notification 516 is sent back to the calling application, for example the RMM agent, with information about the file-event, including but not limited to a list of the suspected files and the deleted files.

Collapse File-Events 542

Before the file-events in the delta are processed, they undergo a transformation to simplify the sequence of file-events.

Creating and modifying office files, for example, creates a long sequence of file-events, involving renames to temporary files etc. Such a sequence can be simplified to a single 'create' or 'update' event.

RW-Analyze File-Events for Possible Ransomware Attack 544

The Metadata for the events included in the simplified delta 542 are analyzed in a way similar to the description in patent application "METHODS AND SYSTEMS FOR DETECTING RANSOMWARE ATTACK IN INCREMENTAL BACKUP". The steps include identifying any candidate files and folders that have an update pattern typical of a ransomware attack.

Check File Encryption Status 550

This step tests a small sample of suspicious files identified as having an update pattern typical of a ransomware attack in 544, if any. According to one exemplary method, it uses entropy-based calculation methods for determining the encryption status of the suspicious files. According to another exemplary embodiment, it uses a High Frequency/Low Frequency entropy-based method as described in pending application "METHODS AND SYSTEMS FOR DETECTING A RANSOMWARE ATTACK USING ENTROPY ANALYSIS AND FILE UPDATE PATTERNS."

While the following configuration data is only one example, a minimum of 10 files is tested by reading up to 256k from each, and relatively small files are ignored. If most of the suspicious files are encrypted (>75%), the RD module issues an RW-alert.

Figure 6:
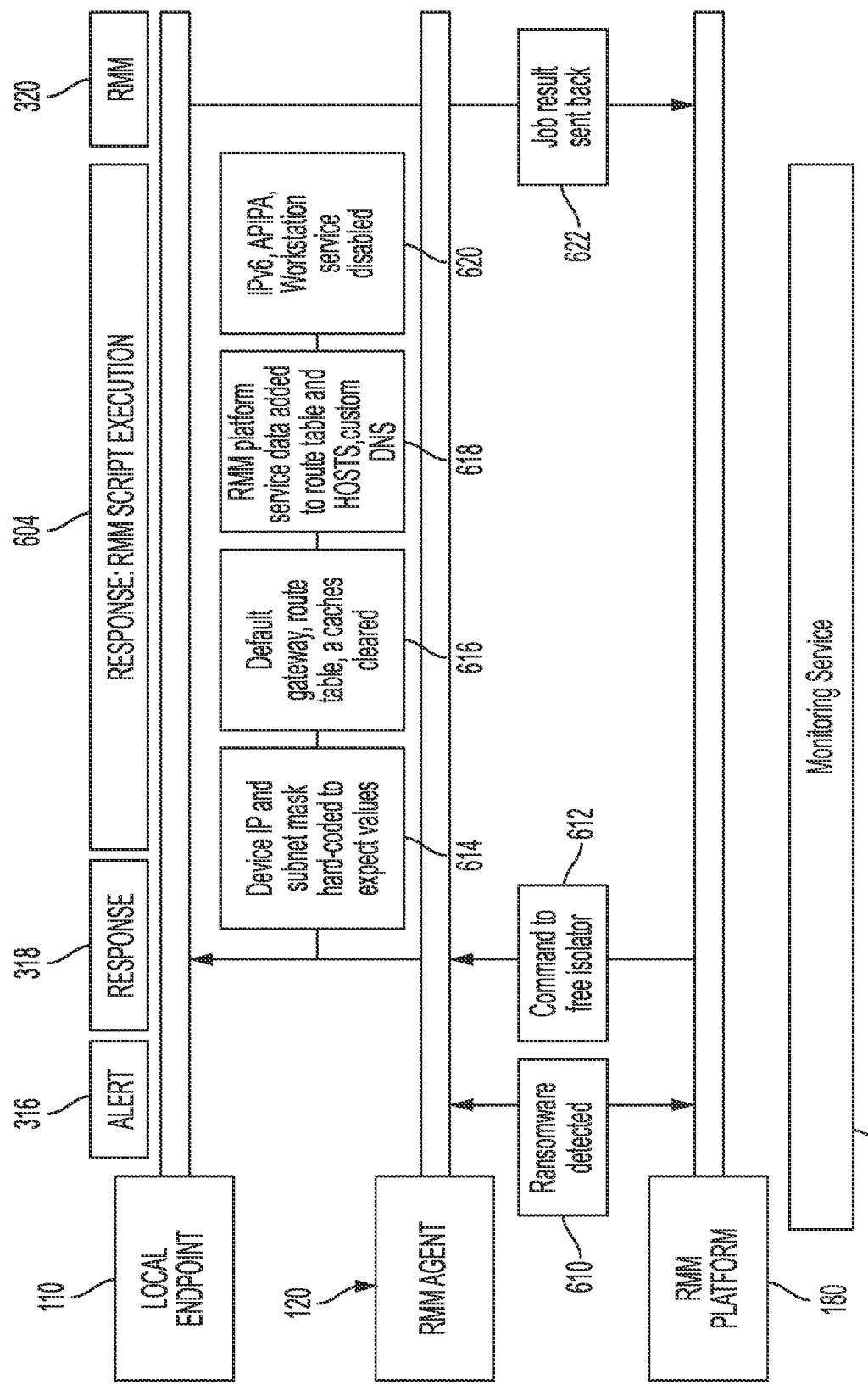
FIG. 6 is a block diagram of a RD and Isolation module operatively associated with a cloud-based RMM platform for monitoring and managing a plurality of devices.

With reference to FIG. 6, shown is a block diagram of a Ransomware Detection (RD) and Isolation module operatively associated with a cloud-based RMM (Remote Monitoring and Management) platform for monitoring and managing a plurality of devices. The method leverages the WINDOWS command interpreter to disable access to all internal and external network locations, with the exception of the RMM service. Initially, the endpoint client device 110 receives a command 612 from the RMM platform 180 and/or RMM agent 120 directly to "begin isolation" 612 in response to the RD module detecting a RWA or potential RWA 610, i.e., RW-alert 316, at which point script execution 604 as described below is run by the Isolation module/RMM agent 120, for example using MICROSOFT PowerShell.

Step 1) 614 Information pertinent to the device's network connection is changed from a temporary configuration ("temporary" within the context of DHCP) to a hard-coded, unchanging configuration, whilst other information is stored. In other words, changing the affected device network information pertinent to the affected device network connection to the RMM platform from a temporary DHCP (Dynamic Host Configuration Protocol) IP address assignment to a static IP address assignment. The network information may include an internal IP (Internet Protocol) address of one or more active network adapters and inactive network adapters ("The Adaptors"), a subnet mask of the one or more network adapters, and a default gateway assignment of the one or more network adapters.

Step 2) 616 Information the device uses in order to connect to both the local network and the wider internet network is nullified, rendering the device unable to access anything via the network. This networking information may include: the DNS server assignments for The Adaptors; the default gateway of The Adaptors; the device's routing table/routing information base; and ARP (Address Resolution Protocol) and NetBIOS caches.

Step 3) 618 Information relevant to maintain a connection to the RMM platform service is re-added to the device's routing table, linking directly to the default gateway IP stored in Step 1) in order to help re-establish a connection for maintenance purposes. This networking information may include: the IP addresses for the RMM platform partner geographical platform assignment; DNS servers; and the device's HOSTS file.

Step 4) 620 Additional steps are taken on the device to further reduce the possibility of unauthorized network connections coming to or from the device. These steps may include disabling Ipv6 access on the device utilizing, for example, MICROSOFT NVSPBind tool; disabling WINDOW's APIPA service; and disabling WINDOW's Workstation Service to block access to network drives.

Step 5) 622 As the connection to the RMM platform has been preserved, the status of the isolation job is sent back to the RMM platform by the RMM agent 320. The device is now only able to communicate with the RMM platform and will be unable to access the greater internet or communicate with any other device on the local network beyond the gateway itself.

Another more detailed description of the isolation method provided herein is provided below, according to an exemplary embodiment of this disclosure.

In response to a Ransomware alert 316, RMM platform 180 responds by running Isolation script on the ransomware affected an endpoint device ("the device") 110.

Isolation script is transmitted via the RMM platform 180 to the device 110 and executed using WINDOWS PowerShell command interpreter 604.

The Isolation script performs the following actions:

Ascertains which geographical RMM platform is being used and collects the relevant IP addresses for this platform into a "routing list" and adds the IP address for the OpenDNS service to the "routing list" 614.

Configures the device, via the WINDOWS NetSH tool, to use the currently assigned internal IP address as a static assignment with the subnet mask of 255.255.255.255. 614.

Removes all pre-configured DNS server information from the device 616.

Adds the IP address of a DNS server from the OpenDNS to the device's DNS pool 616.

Flushes, using the WINDOWS Route tool, the device's routing table 616.

Removes the device's assigned default gateway, storing the setting 616.

Adds each IP address from the "routing list" to the device's local routing table, with a link directly to the IP address from the device's default gateway setting with a subnet mask of 255.255.255.255, so ensuring a direct link between RMM platform servers and the gateway, whilst removing the 'default gateway' assignment, thus nullifying all connectivity between the device and any other network service—internal or external—outside of the RMM platform 616.

Using the WINDOWS Registry, disables the APIPA service, forcing the device to use the settings given to it by the script instead of attempting to use more practical ones 616.

Disables and stops the MICROSOFT "LanManWorkstation" service, removing the device's capability to access mapped network drives 616.

Using WINDOWS' NetSH and NBTStat tools, clears the ARP and NetBIOS caches from the device 616.

Creates a new HOSTS file on the device with a link to the Job Server for the device's geographical RMM Job Server, swapping out (and thus decommissioning) any pre-existing HOSTS file on the device, ensuring the device can access RMM platform (The new HOSTS file contains, in part, 1 line linking the regional Job Server URL to its IP address) 618.

Disables Ipv6 connectivity on the device, for example using MICROSOFT NVSPBind tool, ensuring only Ipv4 internet connectivity 620.

Stores all configuration data from the device's active internet adaptor/s in the Registry for safe keeping 620.

At this point the device can only communicate via the network with the RMM platform; no other connectivity, internally within the network or externally via the internet, is possible.

Provided below is a first code snippet demonstrating how IPv6 functionality is disabled on network adaptors targeted by an isolation procedure, according to an exemplary embodiment of this disclosure.

```
#disable ipv6 for this adaptor
if ($script:NVSP) {
  cmd /c "$env:TEMP\nvspbind-exe.exe /d '"$activeID'"
ms_tcpip6" | out-null
  if ($LASTEXITCODE -eq 0 -or $LASTEXITCODE -eq 13) {
    $varIPv6Disabled='false'
    write-host "- Disabled IPv6"
  } elseif ($LASTEXITCODE -eq 11) {
    $varIPv6Disabled='true'
    write-host "- Disable IPv6: Unnecessary (Already disabled)"
  } else {
    $varIPv6Disabled='true'
    write-host "- Disable IPv6: Unknown status"
  }
} else {
  write-host "- Disable IPv6: Failed (No NVSPBind binary)"
}
```

Provided below is a second code snippet demonstrating how wireless adaptors, post-isolation, are re-connected after the initial isolation process disconnects the wireless adapters, according to an exemplary embodiment of this disclosure.

```
#re-enable wireless adaptor
if ($varIsWireless) {
  cmd /c schtasks /create /sc once /tn RMM-Reconnect /tr "netsh wlan connect name=\'"$varSSID\'" interface=\'"$activeType\'"
" /st $(get-date (Get-Date).AddMinutes(2) -UFormat %R) /RU SYSTEM /F /v1 /z | Out-Null
  write-host "- This network interface is a Wireless adaptor."
  write-host " The isolation process may cause it to briefly lose its connection"
}
```

Provided below is a third code snippet demonstrating how network adaptors that are not being used are disabled in order to prevent WINDOWS rolling over to these network adapters post-isolation, according to an exemplary embodiment of this disclosure.

```
write-host "- Disabling inactive NICs, to prevent switchover:"
foreach ($adaptor in Get-WmiObject -Class Win32_NetworkAdapter) {
  if ($adaptor.GUID -match $script:varNotDisabled) {
    #do nothing
  } else {
    if ($adaptor.GUID) {
      write-host ": $($adaptor.NetConnectionID) [$($adaptor.Name)]"
      $scribt:varDisabled+="^$($adaptor.GUID)"
      try {
        $adaptor.disable( ) 2>&1>$null
        cmd /c "$env:TEMP\nvspbind-exe.exe /d '"$($adaptor.GUID)'" ms_ tcpip" | out-null
        cmd /c "$env:TEMP\nvspbind-exe.exe /d '"$($adaptor.GUID)'" ms_ tcpip6" | out-null
      } catch [system.exception] {
        #do nothing
      }
    }
  }
}
if ($script:varDisabled.Count -eq 0) {
  write-host ": No inactive NICs found to disable."
}
```

Figure 7:
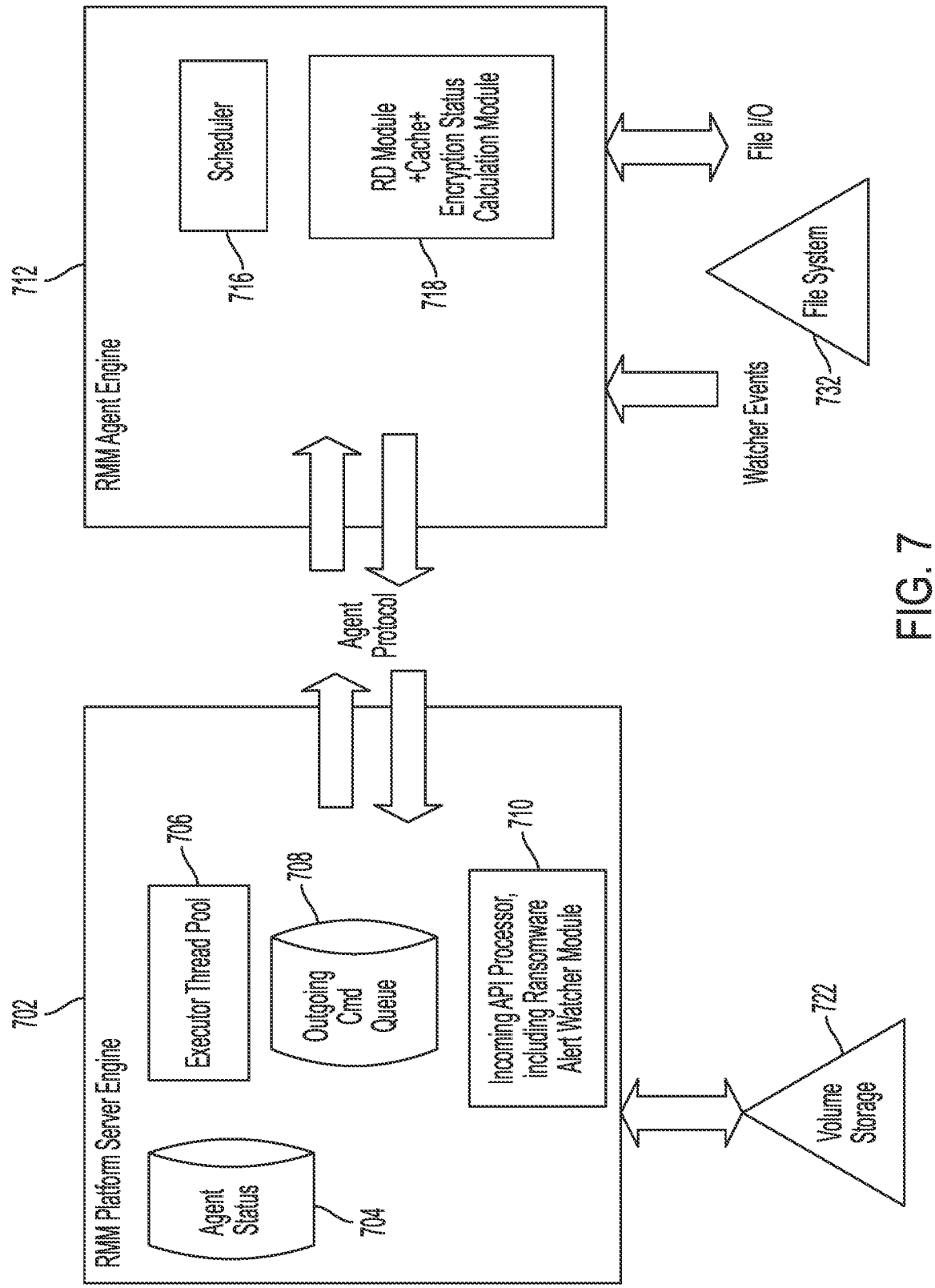
FIG. 7 is a block diagram of an RMM server and agent architecture including a ransomware detection and isolation module according to an exemplary embodiment of this disclosure.

With reference to FIG. 7, shown is a block diagram of an RMM server and agent architecture including a ransomware detection and isolation module according to an exemplary embodiment of this disclosure.

As shown, the architecture includes a RMM platform server engine 702, an RMM agent engine 712 and an agent protocol to facilitate communications between the RMM platform server engine 702 and agent engine 712. The RMM platform server engine 702 includes an agent status module 704; an executor thread pool 706, an outgoing command queue 708, and an incoming API processor 710 including a ransomware alert watcher module. The RMM platform server engine may be operatively associated with a volume storage device 722.

The RMM agent engine 712 includes a scheduler 716 and a RD detection module/cache/encryption status calculation module 718. The RMM agent engine 712 is operatively associated with an OS file system 732 to monitor and detect watcher events and facilitate file I/O between the OS file system and the RMM agent engine 712.

According to an exemplary embodiment, encryption status detection/entropy parameters are calculated on the RD module which resides on a hardware or software implemented desktop-agent. These values are calculated when confirming a possible ransomware attack as indicated in FIG. 4 (416). A list of filenames/paths possibly affected by a ransomware attack is included in the RWA alert information provided by the RD module. The RMM platform API processor provides ransomware and watcher configuration parameter data for the agent. It is to be understood that the encryption/entropy calculations and watcher can both reside on a client device, such as desktop computer, PC, etc. Furthermore, the encryption/entropy calculations, watcher and isolation methods described herein can both reside on a server or other device which receives files from one or more client devices over a network.

Figure 8:
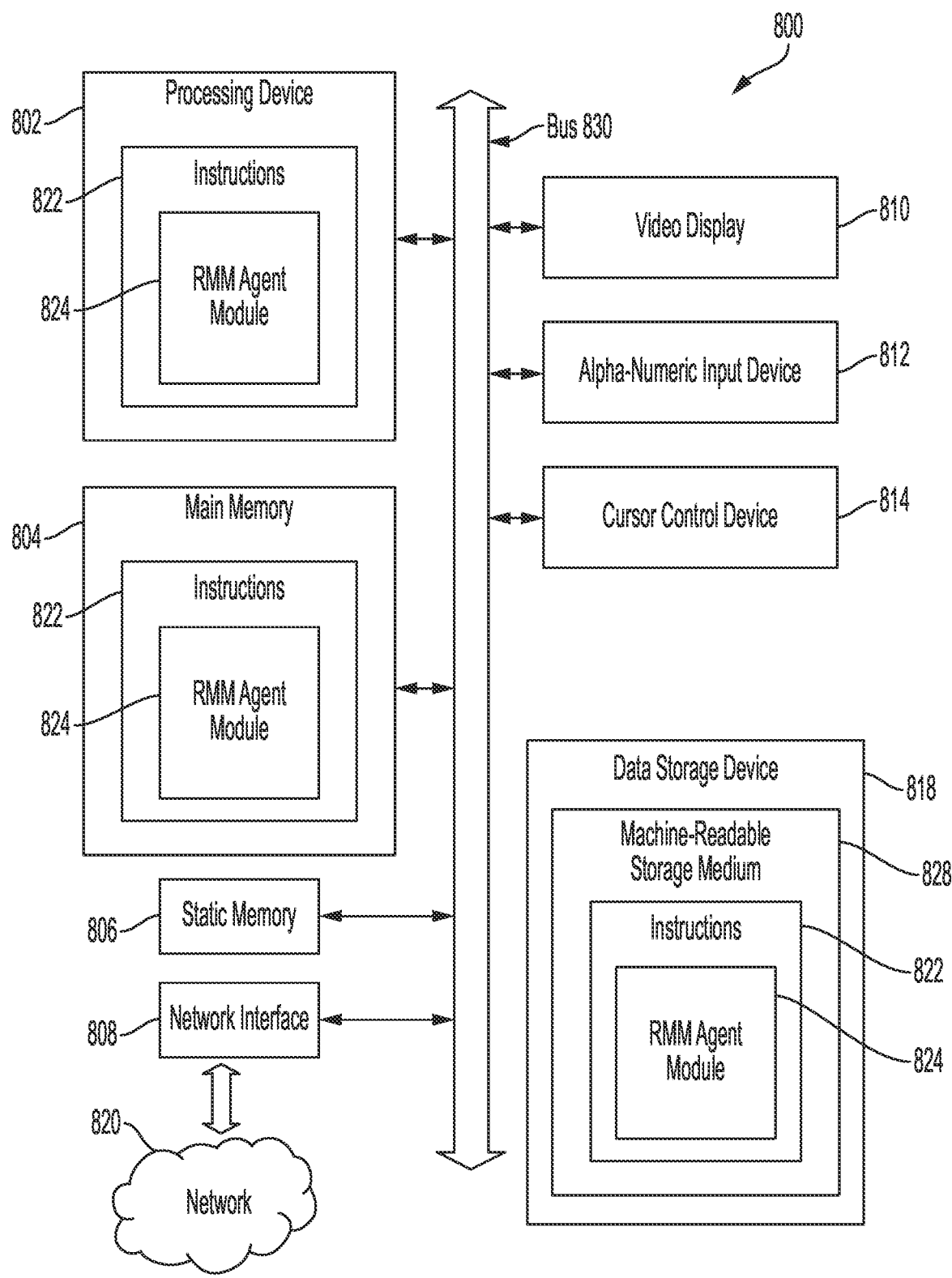
FIG. 8 is a block diagram of a computer system with a set of instructions to perform a ransomware detection and isolation method according to an exemplary embodiment of this disclosure.

With reference to FIG. 8, shown is a block diagram of a computer system with a set of instructions to perform a ransomware detection and isolation method for causing the machine to perform any one or more of the methodologies discussed herein, may be executed. For example, client devices, agent modules, RMM platform server, and/or Storage Servers may be implemented on machines similar to computer system 800. According to various embodiments, the machine may be connected (e.g., networked 820) to other machines in a LAN, an intranet, an extranet, and/or the Internet. The machine may operate in the capacity of a server or a client machine in a client-server network environment, or as a peer machine in a peer-to-peer (or distributed) network environment.

The machine and devices described herein may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or rambus DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, a graphical processing unit (GPU), or the like. The processing device 802 is configured to execute instructions 822 for performing the operations and steps discussed herein.

The computing system 800 may further include a network interface device 808. The computing system 800 also may optionally include a video display unit 810 (e.g., a liquid crystal display (LCD), Light Emitting Diode (LED) monitor, or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-readable storage medium 828 (also known as a computer-readable medium) on which is stored one or more sets of instructions 822 or software embodying any one or more of the methodologies or functions described herein. The instructions 822 may also reside, completely or at least partially, within the main memory 804 and/or within the processing device 802 during execution thereof by the computer system 800, the main memory 804 and the processing device 802 also constituting machine-readable storage media.

In one implementation, the instructions 822 include instructions for a RMM agent module 824, and/or a software library containing methods that can be called by the RMM agent module 824. The instructions in the RMM agent module 824 and/or the software library may be used to implement the methods as described above in relation to FIGS. 1-7. While the machine-readable storage medium 828 is shown in an example implementation to be a single medium, the term "machine-readable storage medium" includes a single medium or multiple media (e.g., a centralized or distributed database, and/or associated caches and servers) that store the one or more sets of instructions. The term "machine-readable storage medium" also includes any medium that is capable of storing or encoding a set of instructions for execution by the machine and that cause the machine to perform any one or more of the methodologies of the present disclosure. The term "machine-readable storage medium" accordingly includes, but is not limited to, solid-state memories, optical media, and magnetic media.

In addition to the methods and systems for ransomware detection and isolation described above, described below are two remediation methods for detecting a ransomware process itself, after the RD module detects a RWA, with the purpose of killing it, so the "damage" to an "attacked" local device can be minimized.

The first remediation method includes a ransomware process identification method implemented in the RW-detection module, i.e. RD module, and the second remediation method includes a ransomware process identification method implemented in the RMM agent module. The two remediation methods described can complement each other, where the RD module immediately kills an identified ransomware process by the first method, and subsequently, the second method performed by the RMM agent performs further processing to identify a ransomware processes not identified by the RD module, confirm the identified ransomware process from the first method and/or identify another ransomware process.

First Remediation Method (RD Module Determines Process to Kill)

General Operation:

After a positive ransomware detection, find all processes that were started before the first encrypted file, but less than n minutes before time of detection (n: 2-5 minutes), and that has not "been seen before".

Next, among these processes, find the process with the highest average accumulated kernel-CPU time, a high number of handles, still running, and not on the exclusion list.

Definitions

ListA: The list of all process names/Ids that has been observed, since RWD started up.

ListB: The list of all process names/Ids that has been observed for the first time, in the last n minutes (not including the initial set of processes on startup).

ListX: exclusion list, static list of processes that is known to have high CPU-usage.

For example, the following processes are not to be considered ransomware processes:

(... "TrustedInstaller","WmiApSrv","audiodg","wuauclt","unsecapp",MpSigStub", msdtc","ScriptedSandbox64","chrome","Taskmgr","UIODetect", "FXSSVC","M RT" ... ).

n: max number of minutes that a process can remain in listB (2-5 minutes).

X: number of seconds between requesting the list of active processes (e.g., 10 sec) from the OS (refresh cycle).

Fst: first time seen, the time a process was "seen" by RWD for the first time. (Now—fst) is the time since process was started, and this value will be a multiple of x.

fet: time of first encrypted file (as estimated by RWD).

Q: minimum handles used by process, to be considered as possible ransomware process (50)

Detailed Description of First Remediation Method.

Step 1) The RD module continuously monitors the processes started on the local device by requesting a list of active processes every x seconds (e.g.,=10 secs), from the OS.

Step 2) The RD module maintains the following lists:

ListA representing the universe of known processes since the RMM agent/RD module program start.

ListA is initialized at startup of the RD module, with a list of all running processes at that time.

Step 3) Every x seconds, the list of current running processes is fetched again, and any process not previously in ListA, is put into ListA AND into a new list, ListB, with a current timestamp fst (time the process was first seen).

Concurrently, i.e., at the same time, 'old' processes are removed from ListB if they have been in the list more than n minutes, based on its timestamp fst.

Step 4) At the time a positive ransomware detection is made, the RD module can make an estimate of when the first encryption of a file occurred fet (first encryption time). Presumably, the ransomware process is considered to have been started before that time, presumably soon before, so the process name should be in ListB.

Step 5) Fetch the list of running processes a last time, and update ListB if there any new ones.

Step 6) For each process in ListB, refresh the process information from the OS, including handles in use, accumulated time spend in kernel mode, and whether or not the process is still running. (The time spent in kernel mode, indicates that a process is using low level access to hardware resources, such as the filesystem, and is therefore a potential candidate. Same can be said about the number of handles used by the process).

Step 7) From ListB, select the process with the highest average kernel CPU-time that is still running and is using a number of handles>q (e.g., 50) and was started before the first encrypted file was seen (fet) and is not in the exclusion list ListX.

The Average kernel CPU-time is computed by dividing the accumulated kernel time (value from OS) with the time since the process was first seen fst (CPU-time/(now-fst in milliseconds)). This favors a process closer to the start of the encryption if more processes have similar kernel CPU-times.

Some edge cases:

Step 8) If fet is less than x seconds ago, set fet to now, to include all new processes. If (now−fst) is 0, because process was started less than x seconds ago, divide the kernel CPU-time with x instead (in milliseconds).

Step 9) After an RWA-detection, the RMM agent is notified about the detection as described earlier, and the name/process Id of a possible ransomware process.

According to this first remediation method, the RD module kills the ransomware process identified in Steps 1-9. According to the second remediation method described below, the RMM agent kills the ransomware process identified in Steps 1-9, if any, and in addition tries to find and kill a process that has high file-activity over a certain time-span.

Provided below is a code snippet, according to an exemplary embodiment of this disclosure, for a method for detecting and identifying a ransomware process to kill as described herein according to the First Remediation Method (RD module determines process to kill).

```
// Maintain plist and plistNew (ListA, listB) every x seconds
        DateTime startTime = DateTime.Now;
    prevlastProccessCheck = lastProccessCheck;
    lastProccessCheck = DateTime.Now;
        // Get list of all running processes
    Process[ ] processCollection = Process.GetProcesses( );
    long durGetProcessList = (long)(DateTime.Now − startTime).TotalMilliseconds;
    int cntp = 0;
        // Add new processes to plist, plistNew
    foreach (Process p in processCollection)
    {
      ProcessInfo pi;
      ProcessInfo piNew = null;
      if (!plist.TryGetValue(p.Id, out pi))
      {
        piNew = new ProcessInfo(p.Id, p.ProcessName);
        plist[p.Id] = piNew; //
      }
      if (piNew != null && !firstTime)
      {
        plistNew[p.Id] = piNew;
        LoggerMgt.LogLnTimeDebug("new process: " + p.ProcessName + " :id= " + p.Id);
        if (p.ProcessName.ToLower( ).Contains("vssadmin"))
            LoggerMgt.LogLnTimeDebug("new process: WARNING:" + "VSSADMIN is running");
      }
      cntp++;
    }
        int cntRem = 0;
// Remove 'old' entries from plistNew
```

```
foreach (int id in plistNew.Keys)
{
  ProcessInfo pn = null;
  if (plistNew.TryGetValue(id, out pn))
  {
    if ((DateTime.Now - pn.firstSeen).TotalMilliseconds > TimeToKeepRWCandidates &&
    fwList.ss == null) // If watcher active, keep list alive some longer
    {
        if (plistNew.TryRemove(id, out pn))
        {
          cntRem++;
        }
    }
  }
}
```

Second Remediation Method (RMM Agent Determines Process to Kill)

General Operation:

The RMM agent makes use of the WINDOWS Performance Counter API to sample the I/O activity of every process over a 1 second period.

Detailed Description of the Second Remediation Method.

Step 1) A ransomware detection event is received from the RwDetect library

Step 7) Sort the processes in descending order of I/O activity.

Step 8) Return the top 3 most I/O intensive processes to the code that kills processes.

Step 9) Kill the process with the most I/O activity.

Provided below is a code snippet, according to an exemplary embodiment of this disclosure, for a method for detecting and identifying a ransomware process to kill as described herein according to the Second Remediation Method (RMM agent determines process to kill).

```
let processInstances (perfmonInstances: (unit -> Set<string>)) =
    let processGenerator: Iobservable<Set<string>> =
        Observable.ofSeq (perfmonInstances ( ))
            |> Observable.map (fun_ -> Set.difference (perfmonInstances ( )) ignoredPerfmonInstances)
        processGenerator
let getPerfmonValue f = try f ( ) |> Choice1Of2 with |_ -> Choice2Of2 ( )
let createIO (perfmon: string -> (unit -> int) * Idisposable) (name:string) =
    Observable.Create
        (fun (obs:Iobserver<_>) ->
            let (f,d) = perfmon name
            match getPerfmonValue f with
            | Choice1Of2 _ -> obs.OnNext f
            | Choice2Of2 _ -> obs.OnCompleted ( )
            d)
    |> Observable.map
        (fun f ->
            Observable.interval (TimeSpan.FromSeconds 1.)
            |> Observable.map (fun _ -> getPerfmonValue f))
    |> Observable.flatmap id
    |> Observable.take 1
    |> Observable.map
        (function
            |Choice1Of2 v -> name, v
            |Choice2Of2 _ -> name, -1)
let topThreeIOProcessInstances perfmonInstances perfmon : Iobservable<list<string>> =
    processInstances perfmonInstances
    |> Observable.take 1
    |> Observable.map (List.ofSeq >> List.map createIO perfmon))
    |> Observable.flatmap (Seq.ofList >> Observable.ofSeq)
    |> Observable.flatmap id
    |> Observable.fold (fun acc t -> t::acc) [ ]
    |> Observable.map (List.sortBy (snd >> (*)-1) >> Seq.truncate 3 >> List.ofSeq >> List.map fst)
```

Step 2) Kill the process identified by the RwDetect library.

Step 3) Build a list of all Windows Performance Counter instance names (essentially all processes running on the computer). Well known processes are ignored.

Step 4) Create a Windows Performance Counter of "Process","IO Write Bytes/sec" for each instance.

Step 5) Using the counter's created in (4) take a snapshot of the I/O activity for every instance.

Step 6) One second later take a further snapshot.

Using the two different ransomware process identification methods described above will increase the probability of finding the correct process to be killed by the RMM agent. The first method has the advantage of being able to kill the identified ransomware process immediately after detection. The second method has the advantage of providing additional processing to identify a ransomware process not identified by the first method if the first method fails. However, the second method takes an additional short time-period to find a candidate process. It is clear that potentially killing 2 processes could result in killing a benign process, but this is an acceptable risk in the given circumstance.

Disclosed herein are exemplary embodiments including, but not limited to the following:

[A1] A compute-implemented method for detecting ransomware-encryption in a plurality of files received by a device operatively associated with a Remote Monitoring and Management (RMM) system, the RMM system operatively associated with monitoring and managing a plurality of devices and the RMM system including a RMM agent module locally installed on each device and operatively communicating with an operating system (OS) installed on each device, a cloud-based RMM platform operatively communicating with each device RMM agent module, the cloud-based RMM platform configured to monitor and manage each of the plurality of devices, and a Ransomware Detection (RD) module locally installed on each device and operatively communicating with each respective device agent module, the RD module configured to detect a potential ransomware-encryption in the plurality of files received, the method comprising: a) the RD module receiving from the RMM platform ransomware monitor configuration data, the ransomware monitor configuration data including one or more watch-items including a list of one or more files, drives, and volumes to monitor for ransomware detection; b) the RD module initiating a filewatcher and filewatcher handler to monitor and receive callbacks for create, delete, update, and rename file-events associated with the watch-items, the filewatcher adding each create, delete, update and rename file-event to a metadata watch-item file-event queue, the metadata watch-item file-event queue including raw watch-item file-event data associated with each create, delete, update, and rename file-event associated with the watch-items, the raw-data including one or more of fileobjects and parent folders identified in the watch-item file-event; and c) a RD module scheduler processing the metadata watch-item file-event queue according to a preset time-based schedule, the scheduler processing any watch-item file-event data included in the metadata watch-item file-event queue to determine a RW-alert state of the RD module, the scheduler operatively associated with an entropy-analysis-based ransomware detection process to detect potential ransomware-encryption of one or more of the watch-items listed in the watch-item file-event queue and generate the RW-alert state which is representative of a positive or negative detection of ransomware-encryption of one or more of the watch-items listed in the watch-item file-event queue.

[A2] The compute-implemented method for detecting a ransomware-encryption in a plurality of files received by a device operatively associated with a Remote Monitoring and Management (RMM) system according to paragraph [A1], wherein the plurality of devices include one or more of a PC (Personal Computer), desktop computer, tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine.

[A3] The compute-implemented method for detecting a ransomware-encryption in a plurality of files received by a device operatively associated with a Remote Monitoring and Management (RMM) system according to paragraph [A1], wherein the preset time-based schedule includes the scheduler generating timer events at a time interval of t, and t equals 1-20 seconds.

[A4] The compute-implemented method for detecting a ransomware-encryption in a plurality of files received by a device operatively associated with a Remote Monitoring and Management (RMM) system according to paragraph [A1], wherein the OS is one of Windows, macOS, UNIX, and Linux.

[A5] The compute-implemented method for detecting a ransomware-encryption in a plurality of files received by a device operatively associated with a Remote Monitoring and Management (RMM) system according to paragraph [A1], wherein the RD module is implemented as a dll (dynamic link library) call function.

[A6] The compute-implemented method for detecting a ransomware-encryption in a plurality of files received by a device operatively associated with a Remote Monitoring and Management (RMM) system according to paragraph [A1], step a) further comprising receiving from the RMM platform ransomware monitor configuration data including an exclusion list of one or more files, drives, and volumes to exclude from monitoring for ransomware detection; and step b) further comprising the filewatcher handler ignoring each create, delete, update and rename file-event included in the exclusion list.

[A7] The compute-implemented method for detecting a ransomware-encryption in a plurality of files received by a device operatively associated with a Remote Monitoring and Management (RMM) system according to paragraph [A1], step b) further comprising: collapsing the raw watch-item file-event data.

The compute-implemented method for detecting a ransomware-encryption in a plurality of files received by a device operatively associated with a Remote Monitoring and Management (RMM) system according to paragraph [A1], step c) further comprising: the scheduler generating timer events according to the preset time-based schedule; and at each timer event, the scheduler determining if the metadata watch-item file-event queue includes any watch-item file-event data, if the metadata watch-item file-event queue does not include any watch-item file-event data, the scheduler terminates until the next timer event is generated, and if the metadata watch-item file-event queue includes any watch-item file-event data, the scheduler extracts the watch-item file-event data, clears the metadata watch-item file-event queue, and processes the extracted watch-item file-event data to determine a RD-module state, the RD-module state including one of abort, continue and RW-alert, the abort state indicating a negative detection of ransomware-encryption of one or more of the watch-items listed in the watch-item file-event queue, the continue state indicating an inconclusive determination of ransomware-encryption of one or more of the watch-items listed in the watch-item file-event queue, and the RW-alert state indicating a detection of ransomware-encryption of one or more of the watch-items listed in the watch-item file-event queue.

[A9] The compute-implemented method for detecting a ransomware-encryption in a plurality of files received by a device operatively associated with a Remote Monitoring and Management (RMM) system according to paragraph [A8], wherein an abort state determination clears the RD-module state, a continue state carries over a previously determined RD-module state and the RW-alert state generates a notification to the RMM platform, the notification including information about one or more suspected ransomware-encryption files.

[A10] The compute-implemented method for detecting a ransomware-encryption in a plurality of files received by a device operatively associated with a Remote Monitoring and Management (RMM) system according to paragraph [A1], step c) further comprising: if the metadata watch-item file-event queue includes any watch-item file-event data, the scheduler extracts the watch-item file-event data and performs one or more of the following: collapsing file-events associated with the watch-item file-event data into one or more other create, delete, update, and rename file-events; analyzing the watch-item file-event data to determine if the associated file events are consistent with one or more predetermined file update patterns representative of a potential ransomware-encryption; and analyzing the watch-item file-event data to determine if the associated file events include one or more of an encryption of a minimum number of files, an encryption of a minimum percentage of files, a low frequency encryption of the files, and a high frequency encryption of the files.

[B1] A RMM (Remote Monitoring and Management) system operatively associated with monitoring and managing a plurality of devices, including ransomware detection, the RMM system comprising: a RMM agent module locally installed on each device and operatively communicating with an OS (operating system) installed on each device; a cloud-based RMM platform operatively communicating with each device RMM agent module, the cloud-based RMM Platform configured to monitor and manage each of the plurality of devices; and a RD (Ransomware Detection) module locally installed on each device and operatively communicating with each respective device RMM agent module, the RD module configured to perform a method of detecting a ransomware-encryption in a plurality of files received by the device, the method including: a) receiving from the RMM platform ransomware monitor configuration data, the ransomware monitor configuration data including one or more watch-items including a list of one or more files, drives, and volumes to monitor for ransomware detection; b) initiating a filewatcher and filewatcher handler to monitor and receive callbacks for create, delete, update, and rename file-events associated with the watch-items, the filewatcher adding each create, delete, update and rename file-event to a metadata watch-item file-event queue, the metadata watch-item file-event queue including raw watch-item file-event data associated with each create, delete, update, and rename file-event associated with the watch-items, the raw-data including one or more of fileobjects and parent folders identified in the watch-item file-event; and c) a scheduler processing the metadata watch-item file-event queue according to a preset time-based schedule, the scheduler processing any watch-item file-event data included in the metadata watch-item file-event queue to determine a RW-alert state of the RD module, the scheduler operatively associated with an entropy-analysis-based ransomware detection process to detect potential ransomware-encryption of one or more of the watch-items listed in the watch-item file-event queue and generate the RW-alert state which is representative of a positive or negative detection of ransomware-encryption of one or more of the watch-items listed in the watch-item file-event queue.

[B2] The RMM (Remote Monitoring and Management) system operatively associated with monitoring and managing a plurality of devices according to paragraph [B1], wherein the plurality of devices include one or more of a PC (Personal Computer), desktop computer, tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine.

[B3] The RMM (Remote Monitoring and Management) system operatively associated with monitoring and managing a plurality of devices according to paragraph [B1], wherein the preset time-based schedule includes the scheduler generating timer events at a time interval of t, and t equals 1-20 seconds.

[B4] The RMM (Remote Monitoring and Management) system operatively associated with monitoring and managing a plurality of devices according to paragraph [B1], wherein the OS is one of Windows, macOS, UNIX, and Linux.

[B5] The RMM (Remote Monitoring and Management) system operatively associated with monitoring and managing a plurality of devices according to paragraph [B1], wherein the RD module is implemented as a dll (dynamic link library) call function.

[B6] The RMM (Remote Monitoring and Management) system operatively associated with monitoring and managing a plurality of devices according to paragraph [B1], step a) further comprising receiving from the RMM platform ransomware monitor configuration data including an exclusion list of one or more files, drives, and volumes to exclude from monitoring for ransomware detection; and step b) further comprising the filewatcher handler ignoring each create, delete, update and rename file-event included in the exclusion list.

[B7] The RMM (Remote Monitoring and Management) system operatively associated with monitoring and managing a plurality of devices according to paragraph [B1], step b) further comprising: collapsing the raw watch-item file-event data.

[B8] The RMM (Remote Monitoring and Management) system operatively associated with monitoring and managing a plurality of devices according to paragraph [B1], step c) further comprising: the scheduler generating timer events according to the preset time-based schedule; and at each timer event, the scheduler determining if the metadata watch-item file-event queue includes any watch-item file-event data, if the metadata watch-item file-event queue does not include any watch-item file-event data, the scheduler terminates until the next timer event is generated, and if the metadata watch-item file-event queue includes any watch-item file-event data, the scheduler extracts the watch-item file-event data, clears the metadata watch-item file-event queue, and processes the extracted watch-item file-event data to determine a RD-module state, the RD-module state including one of abort, continue and RW-alert, the abort state indicating a negative detection of ransomware-encryption of one or more of the watch-items listed in the watch-item file-event queue, the continue state indicating an inconclusive determination of ransomware-encryption of one or more of the watch-items listed in the watch-item file-event queue, and the RW-alert state indicating a detection of ransomware-encryption of one or more of the watch-items listed in the watch-item file-event queue.

[B9] The RMM (Remote Monitoring and Management) system operatively associated with monitoring and managing a plurality of devices according tCo paragraph [B1], wherein an abort state determination clears the RD-module state, a continue state carries over a previously determined RD-module state and the RW-alert state generates a notification to the RMM platform, the notification including information about one or more suspected ransomware-encryption files.

[B10] The RMM (Remote Monitoring and Management) system operatively associated with monitoring and managing a plurality of devices according to paragraph [B1], step c) further comprising: if the metadata watch-item file-event queue includes any watch-item file-event data, the scheduler extracts the watch-item file-event data and performs one or more of the following: collapsing file-events associated with the watch-item file-event data into one or more other create, delete, update, and rename file file-events; analyzing the watch-item file-event data to determine if the associated file events are consistent with one or more predetermined file update patterns representative of a potential ransomware-encryption; and analyzing the watch-item file-event data to determine if the associated file events include one or more of an encryption of a minimum number of files, an encryption of a minimum percentage of files, a low frequency encryption of the files, and a high frequency encryption of the files.

[C1] A RD (Ransomware Detection) module operatively associated with a cloud-based RMM (Remote Monitoring and Management) platform for monitoring and managing a plurality of devices and the RD module locally installed on the plurality of devices, the RD module comprising: a dynamic link library file and API (Application Programming Interface) configured to perform a method of detecting a ransomware-encryption in a plurality of files received by the device, the method including: a) the RD module receiving from the RMM platform ransomware monitor configuration data, the ransomware monitor configuration data including one or more watch-items including a list of one or more files, drives, and volumes to monitor for ransomware detection; b) the RD module initiating a filewatcher and filewatcher handler to monitor and receive callbacks for create, delete, update, and rename file-events associated with the watch-items, the filewatcher adding each create, delete, update and rename file-event to a metadata watch-item file-event queue, the metadata watch-item file-event queue including raw watch-item file-event data associated with each create, delete, update, and rename file-event associated with the watch-items, the raw-data including one or more of fileobjects and parent folders identified in the watch-item file-event; and c) a RD module scheduler processing the metadata watch-item file-event queue according to a preset time-based schedule, the scheduler processing any watch-item file-event data included in the metadata watch-item file-event queue to determine a RW-alert state of the RD module, the scheduler operatively associated with an entropy-analysis-based ransomware detection process to detect potential ransomware-encryption of one or more of the watch-items listed in the watch-item file-event queue and generate the RW-alert state which is representative of a positive or negative detection of ransomware-encryption of one or more of the watch-items listed in the watch-item file-event queue.

[C2] The RD (Ransomware Detection) module operatively associated with a cloud-based RMM (Remote Monitoring and Management) platform for monitoring and managing a plurality of devices according to paragraph [C1], wherein the plurality of devices include one or more of a PC (Personal Computer), desktop computer, tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine.

[C3] The RD (Ransomware Detection) module operatively associated with a cloud-based RMM (Remote Monitoring and Management) platform for monitoring and managing a plurality of devices according to paragraph [C1], wherein the preset time-based schedule includes the scheduler generating timer events at a time interval of t, and t equals 1-20 seconds.

[C4] The RD (Ransomware Detection) module operatively associated with a cloud-based RMM (Remote Monitoring and Management) platform for monitoring and managing a plurality of devices according to paragraph [C1], wherein the OS is one of Windows, macOS, UNIX, and Linux.

[C5] The RD (Ransomware Detection) module operatively associated with a cloud-based RMM (Remote Monitoring and Management) platform for monitoring and managing a plurality of devices according to paragraph [C1], wherein the RD module is implemented as a dll (dynamic link library) call function.

[C6] The RD (Ransomware Detection) module operatively associated with a cloud-based RMM (Remote Monitoring and Management) platform for monitoring and managing a plurality of devices according to paragraph [C1], step a) further comprising receiving from the RMM platform ransomware monitor configuration data including an exclusion list of one or more files, drives, and volumes to exclude from monitoring for ransomware detection; and step b) further comprising the filewatcher handler ignoring each create, delete, update and rename file-event included in the exclusion list.

[C7] The RD (Ransomware Detection) module operatively associated with a cloud-based RMM (Remote Monitoring and Management) platform for monitoring and managing a plurality of devices according to paragraph [C1], step b) further comprising: collapsing the raw watch-item file-event data.

[C8] The RD (Ransomware Detection) module operatively associated with a cloud-based RMM (Remote Monitoring and Management) platform for monitoring and managing a plurality of devices according to paragraph [C1], step c) further comprising: the scheduler generating timer events according to the preset time-based schedule; and at each timer event, the scheduler determining if the metadata watch-item file-event queue includes any watch-item file-event data, if the metadata watch-item file-event queue does not include any watch-item file-event data, the scheduler terminates until the next timer event is generated, and if the metadata watch-item file-event queue includes any watch-item file-event data, the scheduler extracts the watch-item file-event data, clears the metadata watch-item file-event queue, and processes the extracted watch-item file-event data to determine a RD-module state, the RD-module state including one of abort, continue and RW-alert, the abort state indicating a negative detection of ransomware-encryption of one or more of the watch-items listed in the watch-item file-event queue, the continue state indicating an inconclusive determination of ransomware-encryption of one or more of the watch-items listed in the watch-item file-event queue, and the RW-alert state indicating a detection of ransomware-encryption of one or more of the watch-items listed in the watch-item file-event queue.

[C9] The RD (Ransomware Detection) module operatively associated with a cloud-based RMM (Remote Monitoring and Management) platform for monitoring and managing a plurality of devices according to paragraph [C1], wherein an abort state determination clears the RD-module state, a continue state carries over a previously determined RD-module state and the RW-alert state generates a notification to the RMM platform, the notification including information about one or more suspected ransomware-encryption files.

[C10] The RD (Ransomware Detection) module operatively associated with a cloud-based RMM (Remote Monitoring and Management) platform for monitoring and managing a plurality of devices according to paragraph [C1], step c) further comprising: if the metadata watch-item file-event queue includes any watch-item file-event data, the scheduler extracts the watch-item file-event data and performs one or more of the following: collapsing file-events associated with the watch-item file-event data into one or more other create, delete, update, and rename file-event files; analyzing the watch-item file-event data to determine if the associated file events are consistent with one or more predetermined file update patterns representative of a potential ransomware-encryption; and analyzing the watch-item file-event data to determine if the associated file events include one or more of an encryption of a minimum number of files, an encryption of a minimum percentage of files, a low frequency encryption of the files, and a high frequency encryption of the files.

[D1]. A computer implemented method for isolating a ransomware-encryption device operative connected to a cloud-based RMM (Remote Monitoring and Management) platform, the method comprising: a) in response to a ransomware alert detected on a ransomware affected device, the RMM platform transmitting isolation script to the ransomware affected device; the ransomware affected device running the isolation script, the isolation script maintaining the device communication with the RMM platform and disabling the ransomware affected device communication to all other internal and external network locations, the isolation script including: b1) changing the ransomware affected device network information pertinent to the ransomware affected device network connection to the RMM platform from a temporary DHCP (Dynamic Host Configuration Protocol) IP address assignment to a static IP address assignment, the network information including one or more of an internal IP (Internet Protocol) address of one or more active network adapters, inactive network adapters, a subnet mask of the one or more network adapters, a default gateway assignment of the one or more network adapters; b2) nullifying local network and external network information on the ransomware affected device rendering the ransomware affected device unable to access any internal and external network, the nullified local and external network information including one or more of DNS (Domain Name System) server assignments for associated network adapters, default gateways of the associated network adapters, routing table of the ransomware affected device, routing information base of the ransomware affected device, ARP (Address Resolution Protocol) cache and NetBIOS cache; and b3) re-adding to the ransomware affected device routing table the pertinent network information changed to an unchanging DHCP configuration in step b1) directly linking the default gateway IP stored in step b1) to reestablish a network connection from the ransomware affected device to the RMM platform, the re-added network information including one or more of IP addresses for a partner RMM geographical platform, DNS servers, and c) the ransomware affected devices' HOSTS file; and c) the ransomware affected device communicating to the RMM platform over the RMM platform network connection isolation status information.

[D2] The computer implemented method for isolating a ransomware-encryption device operative connected to a cloud-based RMM (Remote Monitoring and Management) platform according to paragraph [D1], wherein the method further comprises: step b) determining a geographical RMM platform being used, collecting the relevant IP addresses of the determined geographical RMM platform and listing the relevant IP addresses in a routing list; and adding IP addresses for the OpenDNS service to the routing list.

[D3] The computer implemented method for isolating a ransomware-encryption device operative connected to a cloud-based RMM (Remote Monitoring and Management) platform according to paragraph [D1], wherein the method further comprises: step b) adding each IP address from the routing list to a device local routing table with a link directly to an IP address of the device default gateway setting with a subnet mask of a fixed value, thereby ensuring a direct link between the RMM platform servers and the gateway while removing the default gateway assignment which nullifies all connectivity between the device and any other network internal and external services.

[D4] The computer implemented method for isolating a ransomware-encryption device operative connected to a cloud-based RMM (Remote Monitoring and Management) platform according to paragraph [D1], wherein the method uses an OS (operating system) registry to disable APIPA (Automatic Private IP Addressing) service to force the device to use the script provided information.

[D5] The computer implemented method for isolating a ransomware-encryption device operative connected to a cloud-based RMM (Remote Monitoring and Management) platform according to paragraph [D1], wherein the device is running a Windows OS (operating system) and the method further comprises: using an OS registry to disable APIPA (Automatic Private IP Addressing) service to force the device to use the script provided information; disabling and stopping the OS LanManWorkstation service to disable the device from accessing mapped network drives; and using the OS NetSH and NBTStat tools, clearing the ARP and NetBIOS caches from the device.

[D6] The computer implemented method for isolating a ransomware-encryption device operative connected to a cloud-based RMM (Remote Monitoring and Management) platform according to paragraph [D1], wherein the isolation script includes disabling IPv6 connectivity on the device and maintaining IPv4 connectivity.

[D7] The computer implemented method for isolating a ransomware-encryption device operative connected to a cloud-based RMM (Remote Monitoring and Management) platform according to paragraph [D1], wherein the isolation script includes storing configuration data associated with one or more of the device's active and inactive internet adapters in the OS registry to reestablish normal connectivity at a later time.

[D8] The computer implemented method for isolating a ransomware-encryption device operative connected to a cloud-based RMM (Remote Monitoring and Management) platform according to paragraph [D1], wherein the ransomware alert is generated by a RD module (Ransomware Detection) locally installed on the ransomware-encryption device and the isolation script is locally run on the ransomware-encryption device.

[D9] The computer implemented method for isolating a ransomware-encryption device operative connected to a cloud-based RMM (Remote Monitoring and Management) platform according to paragraph [D8], wherein the RD module is configured to perform the following: a) the RD module receiving from the RMM platform ransomware monitor configuration data, the ransomware monitor configuration data including one or more watch-items including a list of one or more files, drives, and volumes to monitor for ransomware detection; b) the RD module initiating a file-watcher and filewatcher handler to monitor and receive callbacks for create, delete, update, and rename file-events associated with the watch-items, the filewatcher adding each create, delete, update and rename file-event to a metadata watch-item file-event queue, the metadata watch-item file-event queue including raw watch-item file-event data associated with each create, delete, update, and rename file-event associated with the watch-items, the raw-data including one or more of fileobjects and parent folders identified in the watch-item file-event; and c) a RD module scheduler processing the metadata watch-item file-event queue according to a preset time-based schedule, the scheduler processing any watch-item file-event data included in the metadata watch-item file-event queue to determine a RW-alert state of the RD module, the scheduler operatively associated with an entropy-analysis-based ransomware detection process to detect potential ransomware-encryption of one or more of the watch-items listed in the watch-item file-event queue and generate the RW-alert state which is representative of a positive or negative detection of ransomware-encryption of one or more of the watch-items listed in the watch-item file-event queue.

[D10] The computer implemented method for isolating a ransomware-encryption device operative connected to a cloud-based RMM (Remote Monitoring and Management) platform according to paragraph [D8], wherein the RD module comprises: a dynamic link library file and API (Application Programming Interface) configured to perform a method of detecting a ransomware-encryption in a plurality of files received by the device, the method including: a) the RD module receiving from the RMM platform ransomware monitor configuration data, the ransomware monitor configuration data including one or more watch-items including a list of one or more files, drives, and volumes to monitor for ransomware detection; b) the RD module initiating a filewatcher and filewatcher handler to monitor and receive callbacks for create, delete, update, and rename file-events associated with the watch-items, the filewatcher adding each create, delete, update and rename file-event to a metadata watch-item file-event queue, the metadata watch-item file-event queue including raw watch-item file-event data associated with each create, delete, update, and rename file-event associated with the watch-items, the raw-data including one or more of fileobjects and parent folders identified in the watch-item file-event; and c) a RD module scheduler processing the metadata watch-item file-event queue according to a preset time-based schedule, the scheduler processing any watch-item file-event data included in the metadata watch-item file-event queue to determine a RW-alert state of the RD module, the scheduler operatively associated with an entropy-analysis-based ransomware detection process to detect potential ransomware-encryption of one or more of the watch-items listed in the watch-item file-event queue and generate the RW-alert state which is representative of a positive or negative detection of ransomware-encryption of one or more of the watch-items listed in the watch-item file-event queue.

E1] A Ransomware Detection (RD) and Isolation module operatively associated with a cloud-based RMM (Remote Monitoring and Management) platform for monitoring and managing a plurality of devices, the RD and Isolation module comprising: a dynamic link library file and API (Application Programming Interface) configured to perform a method of detecting a ransomware-encryption in a plurality of files received by the device, the method including: a) the RD module receiving from the RMM platform ransomware monitor configuration data, the ransomware monitor configuration data including one or more watch-items including a list of one or more files, drives, and volumes to monitor for ransomware detection; b) the RD module initiating a filewatcher and filewatcher handler to monitor and receive callbacks for create, delete, update, and rename file-events associated with the watch-items, the filewatcher adding each create, delete, update and rename file-event to a metadata watch-item file-event queue, the metadata watch-item file-event queue including raw watch-item file-event data associated with each create, delete, update, and rename file-event associated with the watch-items, the raw-data including one or more of fileobjects and parent folders identified in the watch-item file-event; c) a RD module scheduler processing the metadata watch-item file-event queue according to a preset time-based schedule, the scheduler processing any watch-item file-event data included in the metadata watch-item file-event queue to determine a RW-alert state of the RD module, the scheduler operatively associated with an entropy-analysis-based ransomware detection process to detect potential ransomware-encryption of one or more of the watch-items listed in the watch-item file-event queue and generate the RW-alert state which is representative of a positive or negative detection of ransomware-encryption of one or more of the watch-items listed in the watch-item file-event queue; d) in response to a positive RW-alert state detected on a ransomware affected device, the RMM platform transmitting isolation script to the ransomware affected device; and e) the ransomware affected device running the isolation script, the isolation script maintaining the device communication with the RMM platform and disabling the ransomware affected device communication to all other internal and external network locations, the isolation script including: e1) changing the ransomware affected device network information pertinent to the ransomware affected device network connection to the RMM platform from a temporary DHCP (Dynamic Host Configuration Protocol) IP address assignment to a static IP address assignment, the network information including one or more of an internal IP (Internet Protocol) address of one or more active network adapters, inactive network adapters, a subnet mask of the one or more network adapters, a default gateway assignment of the one or more network adapters; e2) nullifying local network and external network information on the ransomware affected device rendering the ransomware affected device unable to access any internal and external network, the nullified local and external network information including one or more of DNS (Domain Name System) server assignments for associated network adapters, default gateways of the associated network adapters, routing table of the ransomware affected device, routing information base of the ransomware affected device, ARP (Address Resolution Protocol) cache and NetBIOS cache; and e3) re-adding to the ransomware affected device routing table the pertinent network information changed to an unchanging DHCP configuration in step e1) directly linking the default gateway IP stored in step e1) to reestablish a network connection from the ransomware affected device to the RMM platform, the re-added network information including one or more of IP addresses for a partner RMM geographical platform, DNS servers, and the ransomware affected devices' HOSTS file; and the ransomware affected device communicating to the RMM platform over the RMM platform network connection isolation status information of the ransomware affected device.

[E2] The Ransomware Detection (RD) and Isolation module operatively associated with a cloud-based RMM (Remote Monitoring and Management) platform according to paragraph [E1], wherein the method further comprises:

step e) adding each IP address from the routing list to a device local routing table with a link directly to an IP address of the device default gateway setting with a subnet mask of a fixed value, thereby ensuring a direct link between the RMM platform servers and the gateway while removing the default gateway assignment which nullifies all connectivity between the device and any other network internal and external services.

[E3] The Ransomware Detection (RD) and Isolation module operatively associated with a cloud-based RMM (Remote Monitoring and Management) platform according to paragraph [E1], wherein the device is running a Windows OS (operating system) and the isolation script includes: using an OS registry to disable APIPA (Automatic Private IP Addressing) service to force the device to use the script provided information; disabling and stopping the OS LanManWorkstation service to disable the device from accessing mapped network drives; using OS NetSH and NBTStat tools, clearing the ARP and NetBIOS caches from the device; and using NSPBind tool to disable IPv6 connectivity.

[E4] The Ransomware Detection (RD) and Isolation module operatively associated with a cloud-based RMM (Remote Monitoring and Management) platform according to paragraph [E1], wherein the isolation script includes disabling IPv6 connectivity on the device and maintaining IPv4 connectivity.

[E5] The Ransomware Detection (RD) and Isolation module operatively associated with a cloud-based RMM (Remote Monitoring and Management) platform according to paragraph [E1], wherein the isolation script includes storing configuration associated with one or more of the device's active and inactive internet adapters in the OS registry to reestablish normal connectivity at a later time.

[E6] The Ransomware Detection (RD) and Isolation module operatively associated with a cloud-based RMM (Remote Monitoring and Management) platform according to paragraph [E1], wherein the plurality of devices include one or more of a PC (Personal Computer), desktop computer, tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine.

[E7] The Ransomware Detection (RD) and Isolation module operatively associated with a cloud-based RMM (Remote Monitoring and Management) platform according to paragraph [E1], wherein the preset time-based schedule includes the scheduler generating timer events at a time interval of t, and t equals 1-20 seconds.

[E8] The Ransomware Detection (RD) and Isolation module operatively associated with a cloud-based RMM (Remote Monitoring and Management) platform according to paragraph [E1], wherein the RD module is implemented as a dll (dynamic link library) call function.

[E9] The Ransomware Detection (RD) and Isolation module operatively associated with a cloud-based RMM (Remote Monitoring and Management) platform according to paragraph [E1], step a) further comprising receiving from the RMM platform ransomware monitor configuration data including an exclusion list of one or more files, drives, and volumes to exclude from monitoring for ransomware detection; and step b) further comprising the filewatcher handler ignoring each create, delete, update, and rename file-event included in the exclusion list.

[E10] The Ransomware Detection (RD) and Isolation module operatively associated with a cloud-based RMM (Remote Monitoring and Management) platform according to paragraph [E1], the scheduler generating timer events according to the preset time-based schedule; and at each timer event, the scheduler determining if the metadata watch-item file-event queue includes any watch-item file-event data, if the metadata watch-item file-event queue does not include any watch-item file-event data, the scheduler terminates until the next timer event is generated, and if the metadata watch-item file-event queue includes any watch-item file-event data, the scheduler extracts the watch-item file-event data, clears the metadata watch-item file-event queue, and processes the extracted watch-item file-event data to determine a RD-module state, the RD-module state including one of abort, continue and RW-alert, the abort state indicating a negative detection of ransomware-encryption of one or more of the watch-items listed in the watch-item file-event queue, the continue state indicating an inconclusive determination of ransomware-encryption of one or more of the watch-items listed in the watch-item file-event queue, and the RW-alert state indicating a detection of ransomware-encryption of one or more of the watch-items listed in the watch-item file-event queue.

[F1] A RMM (Remote Monitoring and Management) system operatively associated with monitoring and managing a plurality of devices, including ransomware detection, the RMM system comprising: a RMM agent module locally installed on each device and operatively communicating with an OS (operating system) installed on each device; a cloud-based RMM platform operatively communicating with each device RMM agent module, the cloud-based RMM Platform configured to monitor and manage each of the plurality of devices; and a RD (Ransomware Detection) module locally installed on each device and operatively communicating with each respective device RMM agent module, the RD module configured to perform a method of detecting a ransomware-encryption in a plurality of files received by the device, identifying a ransomware process and killing the ransomware process, the method including: a) receiving from the RMM platform ransomware monitor configuration data, the ransomware monitor configuration data including one or more watch-items including a list of one or more files, drives, and volumes to monitor for ransomware detection; b) initiating a filewatcher and filewatcher handler to monitor and receive callbacks for create, delete, update, and rename file-events associated with the watch-items, the filewatcher adding each create, delete, update and rename file-event to a metadata watch-item file-event queue, the metadata watch-item file-event queue including raw watch-item file-event data associated with each create, delete, update, and rename file-event associated with the watch-items, the raw-data including one or more of fileobjects and parent folders identified in the watch-item file-event; c) a scheduler processing the metadata watch-item file-event queue according to a preset time-based schedule, the scheduler processing any watch-item file-event data included in the metadata watch-item file-event queue to determine a RW-alert state of the RD module, the scheduler operatively associated with an entropy-analysis-based ransomware detection process to detect potential ransomware-encryption of one or more of the watch-items listed in the watch-item file-event queue and generate the RW-alert state which is representative of a positive or negative detection of ransomware-encryption of one or more of the watch-items listed in the watch-item file-event queue; and d) if a RW-alert state is positive, the RD module performing a first remediation method to identify and kill a ransomware process associated with the RW-alert, the first remediation method including: d1) determining all running processes that were started prior to the detection time of a first encrypted file, and started less than a predetermined time before the detection time; d2) of the determined running processes in step d1), determine the currently running process, not included in an exclusion process list, with a highest average accumulated kernel-CPU time and associated with a number of OS handles above a predetermined threshold; and d3) if step d2) and d3) result in an identification of a ransomware process, killing the ransomware process.

[F2] The RMM (Remote Monitoring and Management) system operatively associated with monitoring and managing a plurality of devices according to paragraph [F1], wherein the plurality of devices include one or more of a PC (Personal Computer), desktop computer, tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine.

[F3] The RMM (Remote Monitoring and Management) system operatively associated with monitoring and managing a plurality of devices according to paragraph [F1], wherein, if a RW-alert state is positive, the RMM agent module performs a second remediation method to identify and kill a ransomware process associated with the RW-alert, the second remediation method including: e1) determining all running processes on the local device which are not included in an exclusion process list; e2) of the determined running processes in step e1), create a process performance counter for each determined running process, the process performance counters tracking I/O (Input/Output) write bytes per second for each process; e3) identifying one or more processes in step e2) with the highest relative counter values, indicating these processes include the most I/O intensive processes and are potential ransomware processes; and e4) killing one or more of the processes identified in step e3).

[F4] The RMM (Remote Monitoring and Management) system operatively associated with monitoring and managing a plurality of devices according to paragraph [F1], wherein step e3) comprises: taking a plurality of snapshots of the process performance counters and sorting the associated running processes by I/O activity level.

[F5] The RMM (Remote Monitoring and Management) system operatively associated with monitoring and managing a plurality of devices according to paragraph [F1], wherein the RD module is implemented as a dll (dynamic link library) call function.

[G1] A RMM (Remote Monitoring and Management) system operatively associated with monitoring and managing a plurality of devices, including ransomware detection, the RMM system comprising: a RMM agent module locally installed on each device and operatively communicating with an OS (operating system) installed on each device; a cloud-based RMM platform operatively communicating with each device RMM agent module, the cloud-based RMM Platform configured to monitor and manage each of the plurality of devices; and a RD (Ransomware Detection) module locally installed on each device and operatively communicating with each respective device RMM agent module, the RD module configured to perform a method of detecting a ransomware-encryption in a plurality of files received by the device, identifying a ransomware process and killing the ransomware process, the method including: a) receiving from the RMM platform ransomware monitor configuration data, the ransomware monitor configuration data including one or more watch-items including a list of one or more files, drives, and volumes to monitor for ransomware detection; and b) initiating a filewatcher and filewatcher handler to monitor and receive callbacks for create, delete, update, and rename file-events associated with the watch-items, the filewatcher adding each create, delete, update and rename file-event to a metadata watch-item file-event queue, the metadata watch-item file-event queue including raw watch-item file-event data associated with each create, delete, update, and rename file-event associated with the watch-items, the raw-data including one or more of fileobjects and parent folders identified in the watch-item file-event; c) a scheduler processing the metadata watch-item file-event queue according to a preset time-based schedule, the scheduler processing any watch-item file-event data included in the metadata watch-item file-event queue to determine a RW-alert state of the RD module, the scheduler operatively associated with an entropy-analysis-based ransomware detection process to detect potential ransomware-encryption of one or more of the watch-items listed in the watch-item file-event queue and generate the RW-alert state which is representative of a positive or negative detection of ransomware-encryption of one or more of the watch-items listed in the watch-item file-event queue; wherein, if a RW-alert state is positive, the RMM agent module performs a remediation method to identify and kill a ransomware process associated with the RW-alert, the remediation method including: d1) determining all running processes on the local device which are not included in an exclusion process list; d2) of the determined running processes in step d1), create a process performance counter for each determined running process, the process performance counters tracking I/O (Input/Output) write bytes per second for each process; d3) identifying one or more processes in step d2) with the highest relative counter values, indicating these processes include the most I/O intensive processes and are potential ransomware processes; and d4) killing one or more of the processes identified in step d3).

[G2] The RMM (Remote Monitoring and Management) system operatively associated with monitoring and managing a plurality of devices according to paragraph [G1], wherein the plurality of devices include one or more of a PC (Personal Computer), desktop computer, tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine.

[G3] The RMM (Remote Monitoring and Management) system operatively associated with monitoring and managing a plurality of devices according to paragraph [G1], wherein step d3) comprises: taking a plurality of snapshots of the process performance counters and sorting the associated running processes by I/O activity level.

[G4] The RMM (Remote Monitoring and Management) system operatively associated with monitoring and managing a plurality of devices according to paragraph [G1], further comprising: if a RW-alert state is positive, the RD module performing a first remediation method, prior to the remediation method performed in steps d1)-d4) to identify and kill a ransomware process associated with the RW-alert, the first remediation method including: e1) determining all running processes that were started prior to the detection time of a first encrypted file, and started less than a predetermined time before the detection time; e2) of the determined running processes in step e1), determine the currently running process, not included in an exclusion process list, with a highest average accumulated kernel-CPU time and associated with a number of OS handles above a predetermined threshold; and e3) if step e2) and e3) result in an identification of a ransomware process, killing the ransomware process.

[G5] The RMM (Remote Monitoring and Management) system operatively associated with monitoring and managing a plurality of devices according to paragraph [G1], wherein the RD module is implemented as a dll (dynamic link library) call function.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof

What is claimed is:

1. A RMM (Remote Monitoring and Management) system operatively associated with monitoring and managing a plurality of devices, including ransomware detection, the RMM system comprising:
   one or more processors and one or more memory components communicatively coupled with a data storage device on which is stored one or more sets of instructions wherein the one or more sets of instructions include instructions for:
   a RMM agent module locally installed on each device and operatively communicating with an OS (operating system) installed on each device;
   a cloud-based RMM platform operatively communicating with each device RMM agent module, the cloud-based RMM Platform configured to monitor and manage each of the plurality of devices; and
   a RD (Ransomware Detection) module locally installed on each device and operatively communicating with each respective device RMM agent module, the one or more sets of instructions, in response to being executed by the one or more processors, cause the system to perform operations, the operations comprising:
- a) receiving from the RMM platform ransomware monitor configuration data, the ransomware monitor configuration data including one or more watch-items including a list of one or more files, drives, and volumes to monitor for ransomware detection;
- b) initiating a filewatcher and filewatcher handler to monitor and receive callbacks for create, delete, update, and rename file-events associated with the watch-items, the filewatcher adding each create, delete, update and rename file-event to a metadata watch-item file-event queue, the metadata watch-item file-event queue including raw watch-item file-event data associated with each create, delete, update, and rename file-event associated with the watch-items, the raw-data including one or more of fileobjects and parent folders identified in the watch-item file-event; and
- c) a scheduler processing the metadata watch-item file-event queue according to a preset time-based schedule, the scheduler processing any watch-item file-event data included in the metadata watch-item file-event queue to determine a ransomware-alert state (RW-alert state) of the RD module, the scheduler operatively associated with an entropy-analysis-based ransomware detection process to detect potential ransomware-encryption of one or more of the watch-items listed in the watch-item file-event queue and generate the RW-alert state which is representative of a positive or negative detection of ransomware-encryption of one or more of the watch-items listed in the watch-item file-event queue.

2. The RMM (Remote Monitoring and Management) system operatively associated with monitoring and managing a plurality of devices according to claim 1, wherein the plurality of devices include one or more of a PC (Personal Computer), desktop computer, tablet PC, a set-top box (STB), a Personal Digital Assistant (PDA), a cellular telephone, a web appliance, a server, a network router, a switch or a bridge.

3. The RMM (Remote Monitoring and Management) system operatively associated with monitoring and managing a plurality of devices according to claim 1, wherein the preset time-based schedule includes the scheduler generating timer events at a time interval of t, and t equals 1-20 seconds.

4. The RMM (Remote Monitoring and Management) system operatively associated with monitoring and managing a plurality of devices according to claim 1, wherein the OS is one of a MICROSOFT WINDOWS® operating system, a macOS® operating system, a UNIX® operating system, and a LINUX® operating system.

5. The RMM (Remote Monitoring and Management) system operatively associated with monitoring and managing a plurality of devices according to claim 1, wherein the RD module is implemented as a dll (dynamic link library) call function.

6. The RMM (Remote Monitoring and Management) system operatively associated with monitoring and managing a plurality of devices according to claim 1,
step a) further comprising receiving from the RMM platform ransomware monitor configuration data including an exclusion list of one or more files, drives, and volumes to exclude from monitoring for ransomware detection; and
step b) further comprising the filewatcher handler ignoring each create, delete, update and rename file-event included in the exclusion list.

7. The RMM (Remote Monitoring and Management) system operatively associated with monitoring and managing a plurality of devices according to claim 1, step b) further comprising:
collapsing the raw watch-item file-event data.

8. The RMM (Remote Monitoring and Management) system operatively associated with monitoring and managing a plurality of devices according to claim 1, step c) further comprising:
the scheduler generating timer events according to the preset time-based schedule; and
at each timer event, the scheduler determining if the metadata watch-item file-event queue includes any watch-item file-event data,
if the metadata watch-item file-event queue does not include any watch-item file-event data, the scheduler terminates until the next timer event is generated, and
if the metadata watch-item file-event queue includes any watch-item file-event data, the scheduler extracts the watch-item file-event data, clears the metadata watch-item file-event queue, and processes the extracted watch-item file-event data to determine a RD-module state, the RD-module state including one of abort, continue and RW-alert, the abort state indicating a negative detection of ransomware-encryption of one or more of the watch-items listed in the watch-item file-event queue, the continue state indicating an inconclusive determination of ransomware-encryption of one or more of the watch-items listed in the watch-item file-event queue, and the RW-alert state indicating a detection of ransomware-encryption of one or more of the watch-items listed in the watch-item file-event queue.

9. The RMM (Remote Monitoring and Management) system operatively associated with monitoring and managing a plurality of devices according to claim 1, wherein an abort state determination clears a RD-module state, a continue state carries over a previously determined RD-module state and the RW-alert state generates a notification to the RMM platform, the notification including information about one or more suspected ransomware-encryption files.

10. The RMM (Remote Monitoring and Management) system operatively associated with monitoring and managing a plurality of devices according to claim 1, step c) further comprising:
if the metadata watch-item file-event queue includes any watch-item file-event data, the scheduler extracts the watch-item file-event data and performs one or more of the following:
collapsing file-events associated with the watch-item file-event data into one or more other create, delete, update, and rename file file-events;
analyzing the watch-item file-event data to determine if the associated file events are consistent with one or more predetermined file update patterns representative of a potential ransomware-encryption; and
analyzing the watch-item file-event data to determine if the associated file events include one or more of an encryption of a minimum number of files, an encryption of a minimum percentage of files, a low frequency encryption of the files, and a high frequency encryption of the files.

11. A system, comprising:
one or more processors and one or more memory components communicatively coupled with a data storage device on which is stored one or more sets of instructions wherein the one or more sets of instructions include instructions for:
a Ransomware Detection (RD) and Isolation module operatively associated with a cloud-based RMM (Remote Monitoring and Management) platform for monitoring and managing a plurality of devices, the RD and Isolation module comprising:
a dynamic link library file and API (Application Programming Interface),
the one or more sets of instructions, in response to being executed by the one or more processors, cause the system to perform operations, the operations comprising:
a) a RD module receiving from a RMM platform ransomware monitor configuration data, the ransomware monitor configuration data including one or more watch-items including a list of one or more files, drives, and volumes to monitor for ransomware detection;
b) the RD module initiating a filewatcher and filewatcher handler to monitor and receive callbacks for create, delete, update, and rename file-events associated with the watch-items, the filewatcher adding each create, delete, update and rename file-event to a metadata watch-item file-event queue, the metadata watch-item file-event queue including raw watch-item file-event data associated with each create, delete, update, and rename file-event associated with the watch-items, the raw-data including one or more of fileobjects and parent folders identified in the watch-item file-event;
c) a RD module scheduler processing the metadata watch-item file-event queue according to a preset time-based schedule, the scheduler processing any watch-item file-event data included in the metadata watch-item file-event queue to determine a ransomware-alert state (RW-alert state) of the RD module, the scheduler operatively associated with an entropy-analysis-based ransomware detection process to detect potential ransomware-encryption of one or more of the watch-items listed in the watch-item file-event queue and generate the RW-alert state which is representative of a positive or negative detection of ransomware-encryption of one or more of the watch-items listed in the watch-item file-event queue;
d) in response to a positive RSV-alert state detected on a ransomware affected device, the RMM platform transmitting isolation script to the ransomware affected device; and
e) the ransomware affected device running the isolation script, the isolation script maintaining the device communication with the RMM platform and disabling the ransomware affected device communication to all other internal and external network locations, the isolation script including:
e1) changing the ransomware affected device network information pertinent to the ransomware affected device network connection to the RMM platform from a temporary DHCP (Dynamic Host Configuration Protocol) IP address assignment to a static IP address assignment, the network information including one or more of an internal IP (Internet Protocol) address of one or more active network adapters, inactive network adapters, a subnet mask of the one or more network adapters, a default gateway assignment of the one or more network adapters;
e2) nullifying local network and external network information on the ransomware affected device rendering the ransomware affected device unable to access any internal and external network, the nullified local and external network information including one or more of DNS (Domain Name System) server assignments for associated network adapters, default gateways of the associated network adapters, routing table of the ransomware affected device, routing information base of the ransomware affected device, ARP (Address Resolution Protocol) cache and NetBIOS cache; and
e3) re-adding to the ransomware affected device routing table the pertinent network information changed to an unchanging DHCP configuration in step e1) directly linking the default gateway IP stored in step e1) to reestablish a network connection from the ransomware affected device to the RMM platform, the re-added network information including one or more of IP addresses for a partner RMM geographical platform, DNS servers, and the ransomware affected devices' HOSTS file; and
f) the ransomware affected device communicating to the RMM platform over the RMM platform network connection isolation status information of the ransomware affected device.

12. The system of claim 11, the operations further comprising:
step e4) determining a geographical RMM platform being used, collecting relevant IP addresses of the determined geographical RMM platform and listing the relevant IP addresses in a routing list; and
step e5) adding each IP address from the routing list to a device local routing table with a link directly to an IP address of the device default gateway setting with a subnet mask of a fixed value, thereby ensuring a direct link between the RMM platform servers and the gateway while removing the default gateway assignment which nullifies all connectivity between the device and any other network internal and external services.

13. The system of claim 11, wherein the device is running a MICROSOFT WINDOWS® OS (operating system) and the isolation script includes:
using an OS registry to disable APIPA (Automatic Private IP Addressing) service to force the device to use the script provided information;
disabling and stopping an OS LanManWorkstation service to disable the device from accessing mapped network drives;
using OS NetSH and NBTStat tools, clearing the ARP and NetBIOS caches from the device; and
using NSPBind tool to disable IPv6 connectivity.

14. The system of claim 11, wherein the isolation script includes disabling IPv6 connectivity on the device and maintaining IPv4 connectivity.

15. The system of claim 11, wherein the isolation script includes storing configuration associated with one or more of the device's active and inactive internet adapters in an OS registry to reestablish normal connectivity at a later time.

16. The system of claim 11, wherein the plurality of devices include one or more of a PC (Personal Computer), desktop computer, tablet PC, a set-top box (STB), a Personal Digital Assistant (PDA), a cellular telephone, a web appliance, a server, a network router, a switch or a bridge.

17. The system of claim 11, wherein the preset time-based schedule includes the scheduler generating timer events at a time interval of t, and t equals 1-20 seconds.

18. The system of claim 11, wherein the RD module is implemented as a dll (dynamic link library) call function.

19. The system of claim 11, the operations further comprising:
step a) further comprising receiving from the RMM platform ransomware monitor configuration data including an exclusion list of one or more files, drives, and volumes to exclude from monitoring for ransomware detection; and
step b) further comprising the filewatcher handler ignoring each create, delete, update, and rename file-event included in the exclusion list.

20. The system of claim 11, the operations further comprising:
the scheduler generating timer events according to the preset time-based schedule; and
at each timer event, the scheduler determining if the metadata watch-item file-event queue includes any watch-item file-event data,
if the metadata watch-item file-event queue does not include any watch-item file-event data, the scheduler terminates until the next timer event is generated, and
if the metadata watch-item file-event queue includes any watch-item file-event data, the scheduler extracts the watch-item file-event data, clears the metadata watch-item file-event queue, and processes the extracted watch-item file-event data to determine a RD-module state, the RD-module state including one of abort, continue and RW-alert, the abort state indicating a negative detection of ransomware-encryption of one or more of the watch-items listed in the watch-item file-event queue, the continue state indicating an inconclusive determination of ransomware-encryption of one or more of the watch-items listed in the watch-item file-event queue, and the RW-alert state indicating a detection of ransomware-encryption of one or more of the watch-items listed in the watch-item file-event queue.

21. A RMM (Remote Monitoring and Management) system operatively associated with monitoring and managing a plurality of devices, including ransomware detection, the RMM system comprising:
one or more processors and one or more memory components communicatively coupled with a data storage device on which is stored one or more sets of instructions wherein the one or more sets of instructions include instructions for:
a RMM agent module locally installed on each device and operatively communicating with an OS (operating system) installed on each device;
a cloud-based RMM platform operatively communicating with each device RMM agent module, the cloud-based RMM Platform configured to monitor and manage each of the plurality of devices; and
a RD (Ransomware Detection) module locally installed on each device and operatively communicating with each respective device RMM agent module,
the one or more sets of instructions, in response to being executed by the one or more processors, cause the system to perform operations, the operations comprising:
a) receiving from the RMM platform ransomware monitor configuration data, the ransomware monitor configuration data including one or more watch-items including a list of one or more files, drives, and volumes to monitor for ransomware detection;
b) initiating a filewatcher and filewatcher handler to monitor and receive callbacks for create, delete, update, and rename file-events associated with the watch-items, the filewatcher adding each create, delete, update and rename file-event to a metadata watch-item file-event queue, the metadata watch-item file-event queue including raw watch-item file-event data associated with each create, delete, update, and rename file-event associated with the watch-items, the raw-data including one or more of fileobjects and parent folders identified in the watch-item file-event;
c) a scheduler processing the metadata watch-item file-event queue according to a preset time-based schedule, the scheduler processing any watch-item file-event data included in the metadata watch-item file-event queue to determine a ransomware-alert state (RW-alert state) of the RD module, the scheduler operatively associated with an entropy-analysis-based ransomware detection process to detect potential ransomware-encryption of one or more of the watch-items listed in the watch-item file-event queue and generate the RW-alert state which is representative of a positive or negative detection of ransomware-encryption of one or more of the watch-items listed in the watch-item file-event queue; and
d) if a RW-alert state is positive, the RD module performing a first remediation method to identify and kill a ransomware process associated with the RW-alert; The first remediation method including:
d1) determining all running processes that were started prior to the detection time of a first encrypted file, and started less than a predetermined time before the detection time;
d2) of the determined running processes in step d1), determine the currently running process, not included in an exclusion process list, with a highest average accumulated kernel-CPU time and associated with a number of OS handles above a predetermined threshold; and
d3) if step d2) and d3) result in an identification of a ransomware process, killing the ransomware process.

22. The RMM (Remote Monitoring and Management) system operatively associated with monitoring and managing a plurality of devices according to claim 21, wherein the plurality of devices include one or more of a PC (Personal Computer), desktop computer, tablet PC, a set-top box (STB), a Personal Digital Assistant (PDA), a cellular telephone, a web appliance, a server, a network router, a switch, or a bridge.

23. The RMM (Remote Monitoring and Management) system operatively associated with monitoring and managing a plurality of devices according to claim 21, wherein, if a RW-alert state is positive, the RMM agent module performs a second remediation method to identify and kill a ransomware process associated with the RW-alert, the second remediation method including:

e1) determining all running processes on the local device which are not included in an exclusion process list;

e2) of the determined running processes in step e1), create a process performance counter for each determined running process, the process performance counters tracking I/O (Input/Output) write bytes per second for each process;

e3) identifying one or more processes in step e2) with the highest relative counter values, indicating these processes include the most I/O intensive processes and are potential ransomware processes; and e4) killing one or more of the processes identified in step e3).

24. The RMM (Remote Monitoring and Management) system operatively associated with monitoring and managing a plurality of devices according to claim 23, wherein step e3) comprises:

taking a plurality of snapshots of the process performance counters and sorting the associated running processes by I/O activity level.

25. The RMM (Remote Monitoring and Management) system operatively associated with monitoring and managing a plurality of devices according to claim 21, wherein the RD module is implemented as a dll (dynamic link library) call function.

* * * * *